US008626412B2

(12) United States Patent
Kimura et al.

(10) Patent No.: US 8,626,412 B2
(45) Date of Patent: Jan. 7, 2014

(54) SHIFT-BY-WIRE SYSTEM

(75) Inventors: Kiyoshi Kimura, Kariya (JP); Masaaki Shinojima, Chiryu (JP); Jun Yamada, Nagoya (JP)

(73) Assignee: Denso Corporation, Kariya (JP)

( * ) Notice: Subject to any disclaimer, the term of this patent is extended or adjusted under 35 U.S.C. 154(b) by 207 days.

(21) Appl. No.: 13/296,476

(22) Filed: Nov. 15, 2011

(65) Prior Publication Data

US 2012/0123653 A1    May 17, 2012

(30) Foreign Application Priority Data

Nov. 15, 2010   (JP) .................................. 2010-255194
Nov. 15, 2010   (JP) .................................. 2010-255195
Nov. 15, 2010   (JP) .................................. 2010-255196

(51) Int. Cl.
*B60W 10/06* (2006.01)
*B60W 10/10* (2012.01)
*F16H 61/02* (2006.01)
*F16H 61/28* (2006.01)

(52) U.S. Cl.
CPC ............ *B60W 10/06* (2013.01); *B60W 10/10* (2013.01); *F16H 61/02* (2013.01); *F16H 61/28* (2013.01)
USPC .......................................................... 701/54

(58) Field of Classification Search
CPC ......... F16H 61/02; F16H 61/18; F16H 61/28; F16H 61/68; B60W 10/06; B60W 10/10
USPC ............ 701/54; 475/158; 477/34; 74/473.36
See application file for complete search history.

(56) References Cited

U.S. PATENT DOCUMENTS

| 5,337,715 | A * | 8/1994 | Gonzales et al. ............. 123/325 |
| 7,572,203 | B2 | 8/2009 | Kashiwagi et al. |
| 7,750,795 | B2 | 7/2010 | Nagata |
| 2004/0200301 | A1* | 10/2004 | Amamiya et al. ............. 74/335 |
| 2006/0033464 | A1* | 2/2006 | Nakai et al. .................... 318/701 |
| 2006/0103339 | A1* | 5/2006 | Yamada et al. ............... 318/623 |
| 2006/0207373 | A1 | 9/2006 | Amamiya et al. |
| 2006/0276300 | A1* | 12/2006 | Kashiwagi et al. ............. 477/34 |

(Continued)

FOREIGN PATENT DOCUMENTS

JP    2002-002418    1/2002

OTHER PUBLICATIONS

Japanese Official Action dated Dec. 4, 2012 issued in corresponding Japanese Application No. 2010-255196, with English translation.

*Primary Examiner* — Helal A Algahaim
*Assistant Examiner* — Angelina Shudy
(74) *Attorney, Agent, or Firm* — Nixon & Vanderhye PC

(57) ABSTRACT

When a vehicle electric power source is turned on, and when a target mode position is other than a parking (P)-mode position and a driving (D)-mode position or the target mode position is unfixed, a shift-by-wire electronic control unit (SBW-ECU) does not drive the actuator so that the current actual mode position is maintained. The SBW-ECU accepts only the driver's requirement for changing the mode position to the P-mode position or the D-mode position. When it is required to change the mode position to the P-mode position, a first position learning portion learns a first reference position. When it is required to change the mode position to the D-mode position, a second position learning portion learns a second reference position.

15 Claims, 9 Drawing Sheets

(56) References Cited

U.S. PATENT DOCUMENTS

| | | | |
|---|---|---|---|
| 2007/0046243 A1* | 3/2007 | Hori et al. | 318/630 |
| 2008/0001568 A1* | 1/2008 | Hori et al. | 318/652 |
| 2009/0024286 A1* | 1/2009 | Gierling et al. | 701/51 |
| 2009/0055059 A1* | 2/2009 | Jerger et al. | 701/51 |
| 2009/0287383 A1* | 11/2009 | Fujii et al. | 701/51 |
| 2010/0145583 A1* | 6/2010 | Kamada | 701/62 |
| 2013/0110364 A1* | 5/2013 | Yamada et al. | 701/61 |
| 2013/0151097 A1* | 6/2013 | Deurloo et al. | 701/62 |

* cited by examiner

SHIFT-BY-WIRE SYSTEM

CROSS-REFERENCE TO RELATED APPLICATION

This application is based on Japanese Patent Applications No. 2010-255194 filed on Nov. 15, 2010, No. 2010-255195 filed on Nov. 15, 2010, and No. 2010-255196 filed on Nov. 15, 2010, the disclosures of which are incorporated herein by reference.

FIELD OF THE INVENTION

The present invention relates to a shift-by-wire system which changes a shift gear of an automatic transmission for a vehicle.

BACKGROUND OF THE INVENTION

In a technical field of a vehicle control, a by-wire system has been implemented. The by-wire system has a by-wire control circuit which electrically controls actuators driving components of a vehicle according to a command of a driver of the vehicle. For example, a shift-by-wire system is well known. The shift-by-wire system changes a shift gear of an automatic transmission according to a command of a driver. The shift-by-wire system has an electric actuator which drives a gear mechanism of the automatic transmission to change the shift gear. The electric actuator has a high-speed motor and a reduction gear which reduces the speed of the motor. In a case that a brushless motor, such as a switched reluctance (SR) motor, is employed as the high-speed motor, an incremental type encoder is generally provided to the actuator to output pulse signals according to a rotational position of the motor. The encoder realizes an optimal magnetization energization control of the motor.

In order to drive the gear mechanism of the automatic transmission accurately, it is necessary to detect an absolute rotational position of an output shaft of the reduction gear and to drive the actuator based on the detected absolute rotational position. A linear output sensor or an absolute type encoder is provided at a vicinity of the output shaft to detect the absolute rotational position. Alternatively, a neutral switch is provided on the output shaft. Also, an absolute type encoder which can detect a lot of rotations can be provided on the motor to detect the absolute rotational position of the output shaft.

However, a linear output sensor and an absolute type encoder have disadvantage in their reliability and durability. Even if the linear output sensor and the absolute type encoder can detect the rotational position of the output shaft, a rotational angle of the output shaft can not be detected. Thus, the linear output sensor and the absolute type encoder are not desirable for the shift-by-wire system in view of fail-safe. Further, the absolute type encoder has complicated structure and is expensive. Also, the linear output sensor is relatively expensive.

Japanese Patent No. 4248290 (US-2006-0207373A1), which will be referred to as Patent Document 1 hereinafter, shows a shift-by-wire system in which a shift gear is changed between a parking (P)-mode position and non-parking (non-P)-mode position. In this shift-by-wire system, only an incremental type encoder for magnetization energization control of the motor is employed to learn a reference position corresponding to an absolute position of the output shaft of the actuator. Based on the learned reference position and a predetermined rotational quantity, the absolute value of the output shaft is established and detected. By employing the incremental type encoder to detect the absolute position of the output shaft, manufacturing cost of the system can be decreased.

Further, in the shift-by-wire system shown in Patent Document 1, when an electric power source of the vehicle is turned on, a reference position is learned, which corresponds to at least one of the P-mode position and the non-P-mode position. According to a vehicle condition, such as vehicle speed, of when the power source is turned on, it is determined which reference position of the P-mode position or the non-P-mode position is learned. Thereby, even when the electric power source is turned on immediately after the power source is momentarily turned off, the vehicle can be safely controlled under an ordinal control condition promptly.

However, in the shift-by-wire system shown in Patent Document 1, it is assumed that the automatic transmission has two mode positions (P-mode position and non-P-mode position). Thus, if this shift-by-wire system is applied to an automatic transmission having four mode positions, such as a parking (P)-mode position, a reverse (R)-mode position, a neutral (N)-mode position, and a drive (D)-mode position, it is likely that various problems will occur. For example, if the electric power source is momentarily turned off and then the power source is turned on when the actual mode position is the N-mode position, the mode position is brought into the D-mode position or the P-mode position by the learning control. Thus, the vehicle suddenly runs or stops, which may make the driver anxious. Also, if the electric power source is momentarily turned off and then the power source is turned on when the actual mode position is the R-mode position, the mode position is brought into the D-mode position or the P-mode position by the learning control. Thus, the vehicle suddenly runs forward or stops, which may make the driver anxious.

SUMMARY OF THE INVENTION

The present invention is made in view of the above matters, and it is an object of the present invention to provide a shift-by-wire system which can be safely recovered to a normal control condition even after an electric power supply of a vehicle is momentarily turned off.

According to the present invention, a shift-by-wire system changes a mode position of the automatic transmission of a vehicle according to a signal of a shift selector manipulated by a driver of the vehicle. The shift-by-wire system is provided with an actuator, a detent plate, a detent spring and a control portion. The actuator includes an electric motor, an incremental type encoder outputting a pulse signal according to a rotation of the motor, and a reduction gear reducing the rotation of the motor and outputting the reduced rotation. The detent plate is connected to the reduction gear so as to be rotated by the actuator. Further, the detent plate has a first end concave portion, a second end concave portion, and a plurality of middle concave position. The first end concave portion is formed at one end of the detent plate in its rotational direction. The second end concave portion is formed at the other end of the detent plate in its rotational direction. The middle concave portions are formed between the first end concave portion and the second end concave portion. The detent spring has a regulating portion which can be engaged with one of the first end concave portion, the middle concave portions, and the second end concave portion to regulate a rotation of the detent plate so that the mode position of the automatic transmission is fixed. The control portion defines a target mode position based on the signal of the shift selector and drives the actuator so that the mode position of the automatic transmission is brought into the target mode position.

The first end concave portion corresponds to a parking-mode position of the automatic transmission. The first end concave portion has a first wall. The second end concave portion corresponds to a position for driving a vehicle forward and defines a second wall. The middle concave portions correspond to at least a reverse-mode position and a neutral-mode position.

The control portion includes a first position learning portion and a second position learning portion. The first position learning portion drives the motor in a direction in which the regulating portion is brought into contact with the first wall, and learns a first reference position of the actuator corresponding to the parking-mode position when it is detected that a maximum value or a minimum value of a count number of the pulse signal outputted from the encoder does not change for a specified time period. The second position learning portion drives the motor in a direction in which the regulating portion is brought into contact with the second wall, and learns a second reference position of the actuator corresponding to the drive-mode position when it is detected that the maximum value or the minimum value of the count number of the pulse signal outputted from the encoder does not change for a specified time period.

The rotational position of the actuator with respect to each mode position is computed based on previously stored specified values and the stored first and second reference positions. The actuator is driven to the computed rotational position, whereby the actual mode position is changed to the desired mode position.

In a case that the vehicle electric power source (VEPS) is turned off while the actual mode position is the P-mode position and then the target mode position is the P-mode position when the vehicle electric power source (VEPS) is turned on, the first position learning portion learns the first reference position. Usually, when the actual mode position is the P-mode position, it is assumed that the vehicle is stopped. Therefore, even though the learning of the first reference position is started after the vehicle electric power source (VEPS) is momentarily turned off, the actual mode position is kept at the P-mode position, whereby the first reference position can be learned safely and the normal control condition can be executed.

In a case that the vehicle electric power source (VEPS) is turned off while the actual mode position is the D-mode position and then the target mode position is the D-mode position when the vehicle electric power source (VEPS) is turned on, the second position learning portion learns the second reference position. When the actual mode position is the D-mode position, it is assumed that the vehicle is running. Thus, even though the learning of the second reference position is started after the vehicle electric power source (VEPS) is momentarily turned off, the actual mode position is kept at the D-mode position, whereby the second reference position can be learned safely and the normal control condition can be executed.

Further, when the vehicle electric power source (VEPS) is turned off while the actual mode position is other than the P-mode position and the D-mode position, and then the vehicle electric power source (VEPS) is turned on, if the target mode position is other than the P-mode position and the D-mode position or the target mode position is unfixed, the control portion does not drive the actuator 30 so that the current actual mode position is maintained. The control portion accepts only the driver's requirement for changing the mode position to the P-mode position or the mode position corresponding to the second end concave portion. When it is required to change the mode position to the P-mode position, the first position learning portion learns the first reference position. When it is required to change the mode position to the mode position corresponding to the second end concave portion, the second position learning portion learns the second reference position.

According to the above configuration, when the actual mode position of before the vehicle electric power source (VEPS) is momentarily turned off is other than the P-mode position and the mode position corresponding to the second end concave portion, the actual mode position of before the vehicle electric power source (VEPS) is momentarily turned off is maintained without learning the first reference position and the second reference position. Thus, in the automatic transmission, even if the vehicle electric power source (VEPS) is momentarily turned off while the actual mode position is the N-mode position, the actual mode position is maintained at the N-mode position even after the vehicle electric power source (VEPS) is turned on. Therefore, it can be avoided that an unintentional reverse torque is generated when the actual mode position is changed to the P-mode position through the R-mode position so as to learn the first reference position. It can be avoided that the parking lock mechanism is damaged or the vehicle is suddenly stopped due to a sudden mode position change into the P-mode position while the vehicle is running. When the second reference position is learned, it can be avoided that the actual mode position is brought into the D-mode position and the unintentional forward torque is generated. Furthermore, when the vehicle electric power is momentarily turned off while the actual mode position is the R-mode position, the actual mode position is maintained at the R-mode position even after the vehicle electric power is turned on. Thus, it can be avoided that the vehicle is suddenly stopped when the actual mode position is changed to the P-mode position so as to learn the first reference position. Also, it can be avoided that the actual mode position is brought into the D-mode position and the vehicle runs forward unintentionally.

As described above, according to the shift-by-wire system of the present invention, even if the vehicle electric power source (VEPS) is momentarily turned off, the normal control can be safely recovered. Further, according to the present invention, since the incremental type encoder is employed to detect the rotational position of the actuator, the configuration of the system can be simplified.

According to another aspect of the present invention, the shift-by-wire system is provided with an actuator, a detent plate, a detent spring, a control portion and a torque control portion. The actuator includes an electric motor, an incremental type encoder outputting a pulse signal according to a rotation of the motor, and a reduction gear reducing the rotation of the motor and outputting the reduced rotation. The detent plate is connected to the reduction gear so as to be rotated by the actuator. Further, the detent plate has a first end concave portion, a second end concave portion, and a plurality of middle concave position. The first end concave portion is formed at one end of the detent plate in its rotational direction. The second end concave portion is formed at the other end of the detent plate in its rotational direction. The middle concave portions are formed between the first end concave portion and the second end concave portion. The detent spring has a regulating portion which can be engaged with one of the first end concave portion, the middle concave portions, and the second end concave portion to regulate a rotation of the detent plate so that the mode position of the automatic transmission is fixed. The control portion defines a target mode position based on the signal of the shift selector and drives the actuator so that the mode position of the automatic transmission is brought into the target mode position. The torque control portion can intercept or reduce the transmission of a driving torque to a wheel of a vehicle.

The first end concave portion corresponds to a parking-mode position of the automatic transmission. The first end concave portion has a first wall. The second end concave portion corresponds to a position for driving a vehicle forward and defines a second wall. The second end concave portion has a second wall. The middle concave portions correspond to at least a reverse-mode position and a neutral-mode position.

The control portion includes a first position learning portion, a second position learning portion and a power source determining portion. The first position learning portion drives the motor in a direction in which the regulating portion is brought into contact with the first wall, and learns a first reference position of the actuator corresponding to the parking-mode position when it is detected that a maximum value or a minimum value of a count number of the pulse signal outputted from the encoder does not change for a specified time period. The second position learning portion drives the motor in a direction in which the regulating portion is brought into contact with the second wall, and learns a second reference position of the actuator corresponding to the driving-mode position when it is detected that a maximum value or a minimum value of a count number of the pulse signal outputted from the encoder does not change for a specified time period.

The control portion computes a rotational position of the actuator with respect to each mode position based on the stored specified values and the stored first and second reference positions. The actuator is driven to the computed rotational position, whereby the actual mode position is changed to the desired mode position.

The power source determining portion determines whether the vehicle electric power source (VEPS) is intentionally turned on by a driver or the vehicle electric power source (VEPS) is automatically turned on after momentarily turned off without respect to the driver's intension.

When it is determined that the vehicle electric power source (VEPS) is intentionally turned on by a driver, the first position learning portion learns the first reference position. Usually, when the vehicle electric power source (VEPS) is intentionally turned on, the actual mode position is the parking-mode position and it is assumed that the vehicle is stopped. Therefore, even though the learning of the first reference position is started after the vehicle electric power source (VEPS) is momentarily turned off, the actual mode position is kept at the parking-mode position, whereby the first reference position can be learned safely and the normal control condition can be executed. Further, in a case that the vehicle electric power source (VEPS) is unintentionally turned off while the actual mode position is other than the parking-mode range and then the vehicle electric power source (VEPS) is intentionally turned on by a driver, even if the learning of the first reference position is started and the wheels are locked, there is no problem because the vehicle is stopped.

Meanwhile, when it is determined that the vehicle electric power source (VEPS) is turned on after momentarily turned off, the torque control portion intercepts the transmission of the driving torque and makes impossible to receive a requirement for changing the mode position. At least one of the first reference position and the second reference position is learned, subsequently the mode position is changed to the specified mode position and it is made possible to receive a requirement for changing the mode position.

According to the above configuration, after the torque control portion intercepts or reduces the transmission of the driving torque and it is made impossible to receive a requirement for changing the mode position, the leaning of at least one of the first or the second reference position is executed. Thus, in the automatic transmission 20 having four mode positions, for example, if the vehicle electric power source (VEPS) is momentarily turned off while the actual mode position is the neutral-mode position, the driving torque transmission to the wheels is intercepted or reduced. Thus, it can be avoided that an unintentional reverse torque is generated when the actual mode position is changed to the P-mode position through the R-mode position so as to learn the first reference position. Further, when the second reference position is learned, it can be avoided that the actual mode position is brought into the D-mode position and the unintentional forward torque is generated. Furthermore, when the vehicle electric power is momentarily turned off while the actual mode position is the reverse-mode position, the torque transmission to the wheels is intercepted or reduced, whereby it can be avoided that the actual mode position is brought into the D-mode position and the vehicle runs forward unintentionally.

As above, according to the shift-by-wire system of the present invention, even if the vehicle electric power source (VEPS) is momentary turned off, the normal control can be safely recovered. Further, according to the present invention, since the incremental type encoder is employed to detect the rotational position of the actuator, the configuration of the system can be simplified.

According to another aspect of the present invention, a shift-by-wire system is provided with an actuator, a detent plate, a detent spring and a control portion. The actuator includes an electric motor, an incremental type encoder outputting a pulse signal according to a rotation of the motor, and a reduction gear reducing the rotation of the motor and outputting the reduced rotation. The detent plate is connected to the reduction gear so as to be rotated by the actuator. Further, the detent plate has a first end concave portion, a second end concave portion, and a plurality of middle concave position. The first end concave portion is formed at one end of the detent plate in its rotational direction. The second end concave portion is formed at the other end of the detent plate in its rotational direction. The middle concave portions are formed between the first end concave portion and the second end concave portion. The detent spring has a regulating portion which can be engaged with one of the first end concave portion, the middle concave portions, and the second end concave portion to regulate a rotation of the detent plate so that the mode position of the automatic transmission is fixed. The control portion defines a target mode position based on the signal of the shift selector and drives the actuator so that the mode position of the automatic transmission is brought into the target mode position.

The first end concave portion corresponds to a parking-mode position of the automatic transmission. The first end concave portion has a first wall. The second end concave portion corresponds to a position for driving a vehicle forward and defines a second wall. The middle concave portions correspond to at least a reverse-mode position and a neutral-mode position.

The control portion includes a first position learning portion and a power source determining portion. The first position learning portion drives the motor in a direction in which the regulating portion is brought into contact with the first wall, and learns a first reference position of the actuator corresponding to the parking-mode position when it is detected that a maximum value or a minimum value of a count number of the pulse signal outputted from the encoder does not change for a specified time period.

The control portion computes a rotational position of the actuator with respect to each mode position based on a previously stored specified value and the first reference position. Then, the actuator is driven so that its rotational position agrees with the computed rotational position.

The power source determining portion determines whether a driver intentionally turns off an ignition switch and then turns on the ignition switch again or the vehicle electric power is momentarily turned off without respect to the driver's intension and then automatically turned on.

When it is determined that the vehicle electric power source (VEPS) is intentionally turned on by a driver, the first position learning portion learns the first reference position. Usually, in this case, it is assumed that the actual mode position is the P-mode position and the vehicle is stopped. Therefore, even though the learning of the first reference position is started at this moment, the actual mode position is kept at the parking-mode position, whereby the first reference position can be learned safely and the normal control condition can be executed. Further, in a case that the vehicle electric power source (VEPS) is unintentionally turned off while the actual mode position is other than the parking-mode position and then the vehicle electric power source (VEPS) is intentionally turned on by a driver, even if the learning of the first reference position is started and the wheels are locked, there is no problem because the vehicle is stopped.

When it is determined that the vehicle electric power source (VEPS) is turned on after momentarily turned off, the control portion indicates to the driver that the vehicle should be stopped and the vehicle electric power source (VEPS) is turned off when the mode position is changed. The actuator is not driven so that the actual mode position is maintained.

According to the shift-by-wire system of the present invention, even if the vehicle electric power source (VEPS) is momentarily turned off, the normal control can be safely recovered. Further, according to the present invention, since the incremental type encoder is employed to detect the rotational position of the actuator, the configuration of the system can be simplified.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Figure 1:
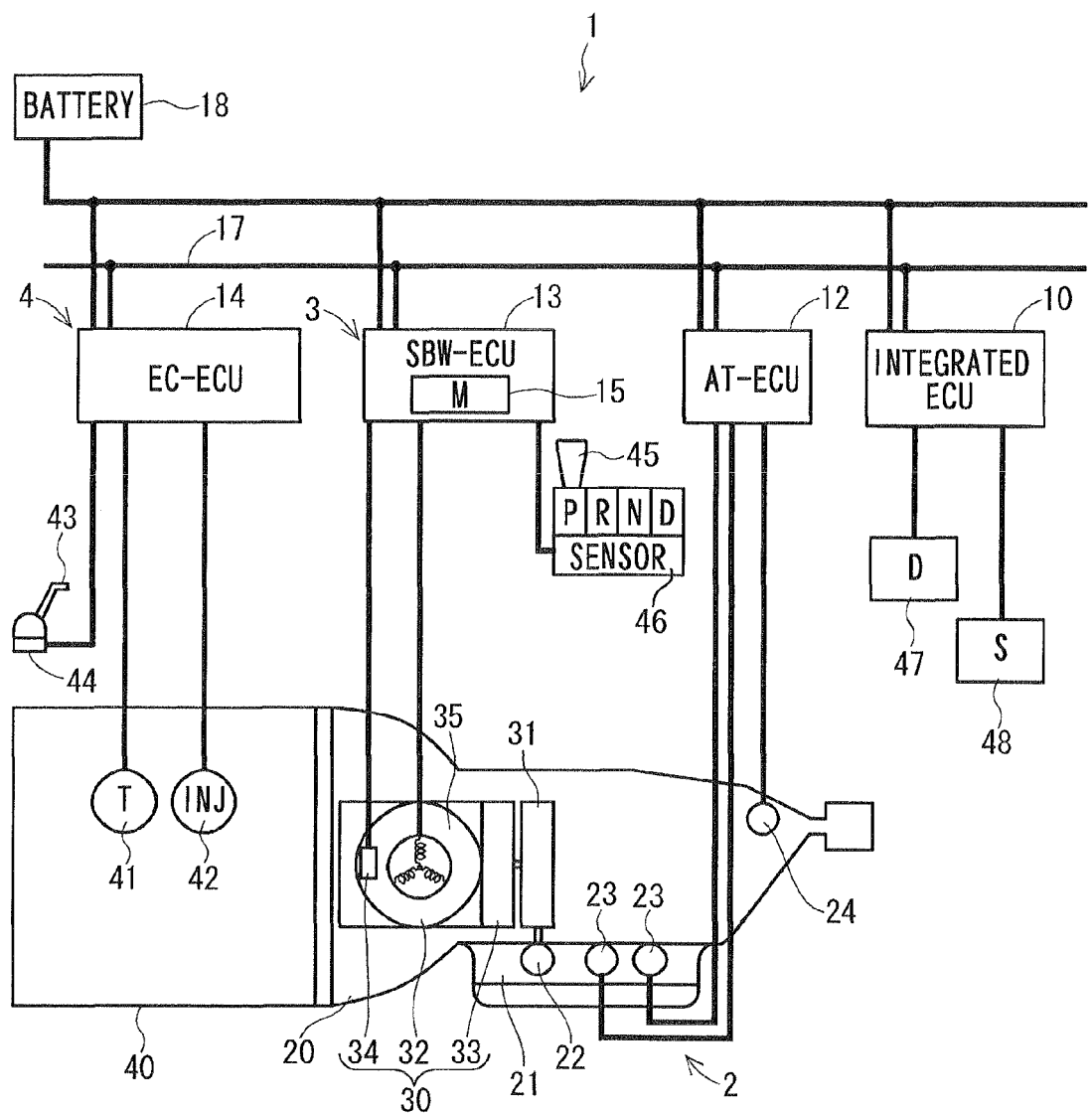
FIG. 1 is a schematic view showing a vehicle control system including a shift-by-wire system according to a first embodiment.

Multiple embodiments of the present invention will be described with reference to accompanying drawings. In each embodiment, the substantially same parts and the components are indicated with the same reference numeral and the same description will not be reiterated. Further, an electric control unit will be referred to as an ECU, hereinafter.

First Embodiment

FIG. 1 shows a vehicle control system 1 including a shift-by-wire system 3 according to a first embodiment. For example, the vehicle control system 1 mounted on a four-wheel vehicle is comprised of an automatic transmission control system 2, a shift-by-wire system 3, an engine control system 4 and an integrated ECU 10.

The automatic transmission control system 2, the shift-by-wire system 3 and the engine control system 4 respectively include an automatic transmisson electronic control unit (AT-ECU) 12, a SBW-ECU 13 and an engine control transmission electronic control unit (EC-ECU) 14. Each of the AT-ECU 12, the SBW-ECU 13, and the EC-ECU 14 includes a microcomputer. The AT-ECU 12, the SBW-ECU 13, and the EC-ECU 14 are mutually connected electrically or optically via LAN line 17. Further, the AT-ECU 12, the SBW-ECU 13, the EC-ECU 14, and the integrated ECU 10 are electrically connected to a battery 18 which is an electric power source of the vehicle. The integrated ECU 10 controls the vehicle control system 1 in cooperation with the AT-ECU 12, the SBW-ECU 13 and the EC-ECU 14. In the present embodiment, the SBW-ECU 13 corresponds to a control portion of the present invention.

The automatic transmission control system 2 hydraulically drives the automatic transmission 20. The automatic transmission control system 2 is provided with an oil-hydraulic circuit 21 which changes the mode position of the automatic transmission 20. According to the present embodiment, the automatic transmission 20 has a drive (D)-mode position, a reverse (R)-mode position, a parking (P)-mode position and a neutral (N)-mode position. The oil-hydraulic circuit 21 includes a manual valve 22 which is a spool valve as a mode-position selecting mechanism. The manual valve 22 axially slides to switch the oil-hydraulic circuit 21, whereby the mode position of the automatic transmission 20 is determined. The automatic transmission 20 is provided with a plurality of friction engaging element. A plurality of solenoid valve 23 provided to the oil-hydraulic circuit 21 hydraulically drive the corresponding friction engaging element. Thereby, each friction engaging element is engaged or disengaged by oil pressure supplied from the solenoid valve 23.

The AT-ECU 12 is electrically connected to the electric components, such as the solenoid valve 23. The AT-ECU 12 electrically controls output oil pressure of the solenoid valve 23, whereby each friction engaging element of the automatic transmission 20 is engaged or disengaged. Further, the AT-ECU 12 is electrically connected to a vehicle speed sensor 24. The AT-ECU 12 controls the solenoid valve 23 according to a detected vehicle speed.

The shift-by-wire system 3 includes the manual valve 22, an actuator 30 driving a parking lock mechanism 70 (FIG. 3) and the gear mechanism 31. It should be noted that the SBW-ECU 13 is a component of the shift-by-wire system 3. The actuator 30 has a motor 32, an encoder 34 and a reduction gear 33.

Figure 2:
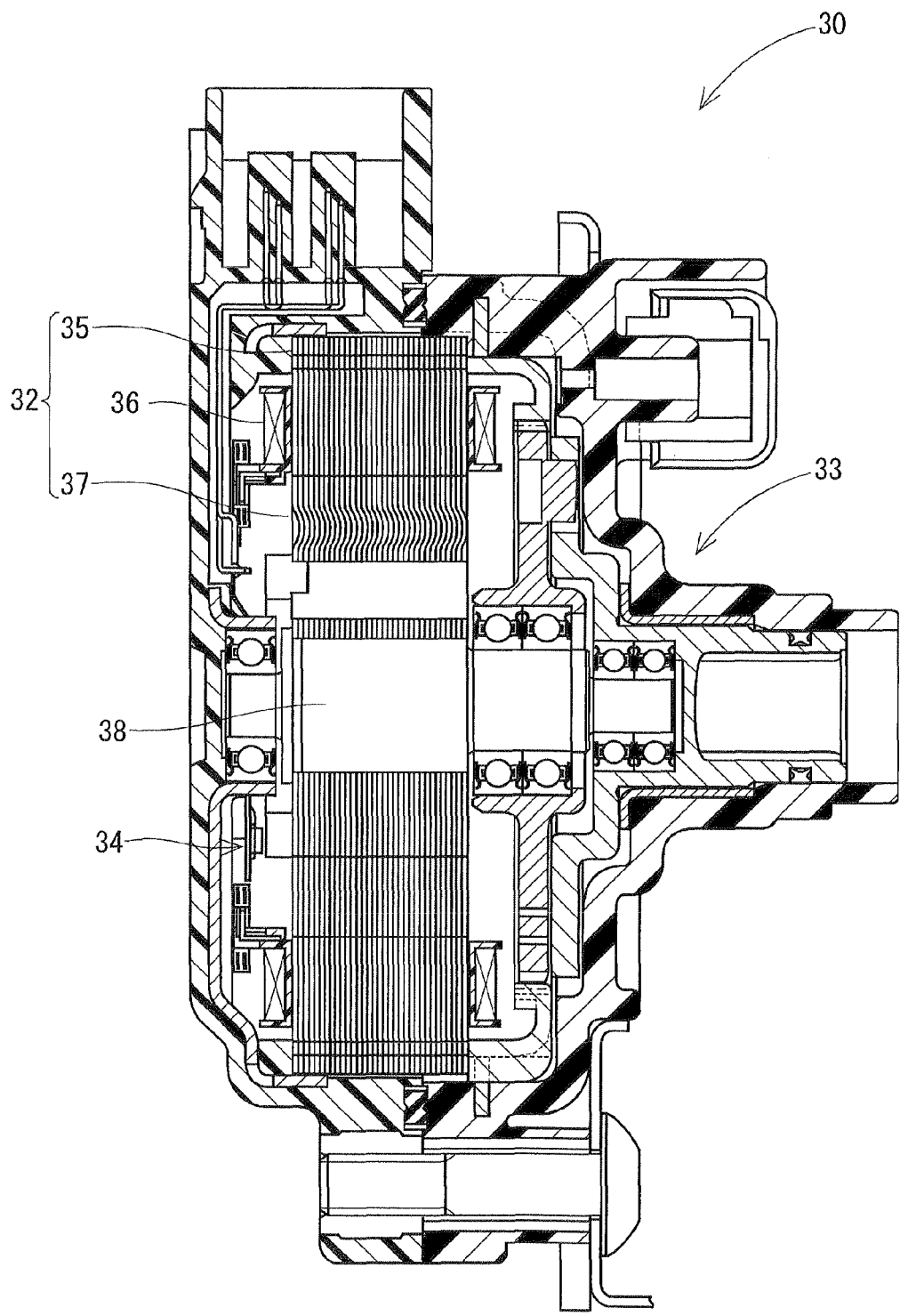
FIG. 2 is a cross sectional view showing an actuator of the shift-by-wire system according to the first embodiment.

The motor 32 is a switched reluctance (SR) motor which is a brushless motor having no permanent magnet. As shown in FIG. 2, the motor 32 has a plurality of stator 35 with which a plurality of coil 36 is engaged. Further, the motor 32 has a rotor 37 inside of the stator 35. The rotor 37 has an axial center shaft 38 which is supported by a housing of the actuator 30.

The SBW-ECU 13 energizes the coils 36 at a specified timing to rotate the rotor 37 around the shaft 38.

The encoder 34 is accommodated in the housing of the actuator 30. The encoder 34 is comprised of a magnet rotating with the rotor 37 and a Hall IC detecting magnetic flux. The encoder 34 outputs pulse signals according to rotation quantity of the rotor 37.

The encoder 34 is an incremental type encoder which outputs pulse signals according to the rotation of the motor 32. The SBW-ECU 13 decreases (countdown) or increases (count up) the count number according to the pulse signals outputted from the encoder 34. Thereby, the SBW-ECU 13 can detect rotation condition of the motor 32. The SBW-ECU 13 can rotate the motor 32 at a high speed without stepping out. When the electric power source of the vehicle is turned on, an initial driving control is performed in order to synchronize the count number with the energization phase of the motor 32. By performing the initial driving control, the rotation of the actuator 30 can be properly controlled.

The reduction gear 33 reduces a rotational motion of the motor 32 and transmits the reduced rotational motion to the gear mechanism 31. The gear mechanism 31 transmits the rotational motion to the manual valve 22 and the parking lock mechanism 70.

Figure 3:
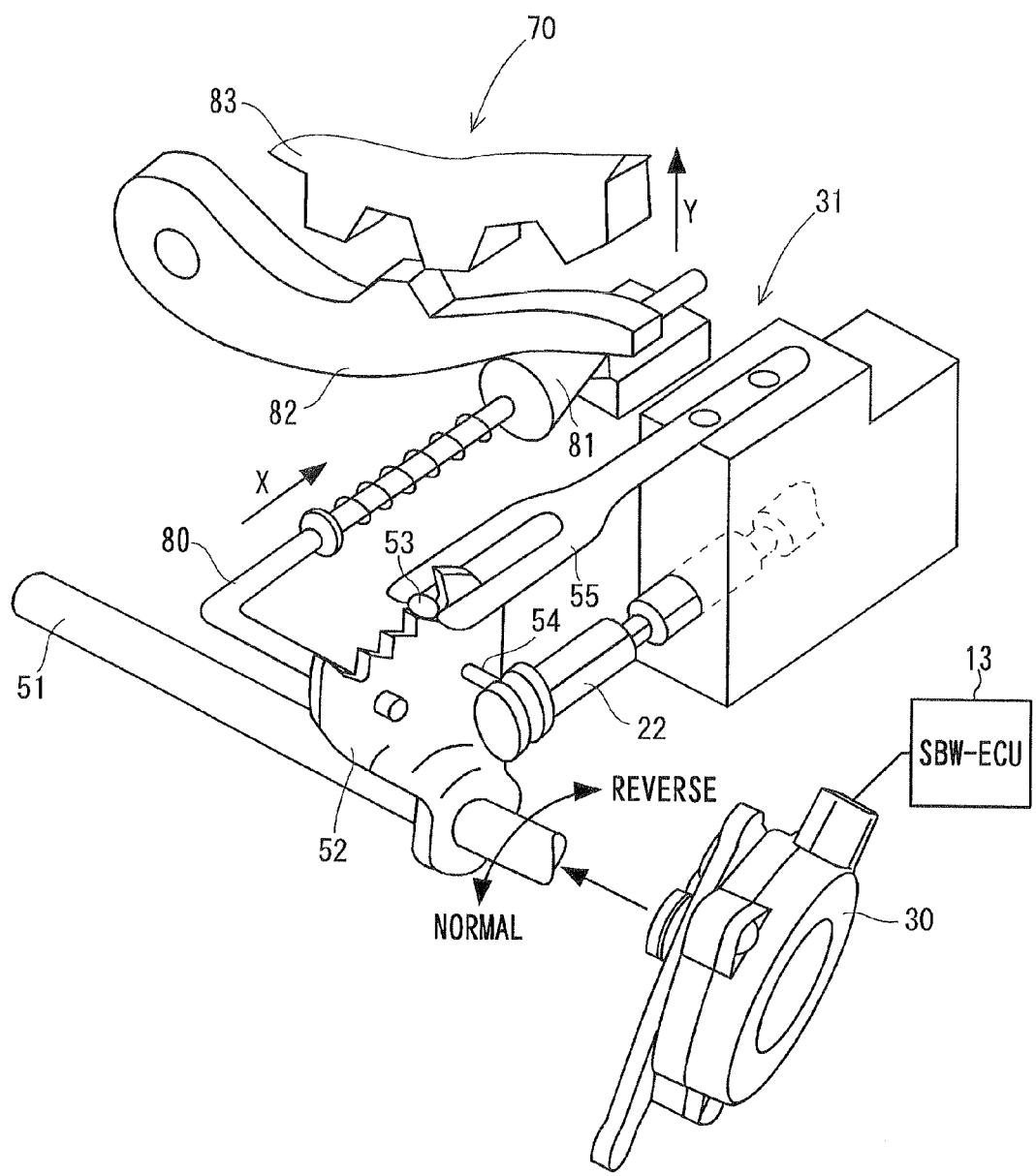
FIG. 3 is a schematic view showing a transmission mechanism of the shift-by-wire system according to the first embodiment.

As shown in FIG. 3, the gear mechanism 31 has a manual shaft 51, a detent plate 52, and a detent spring 55. The manual shaft 51 is connected to the reduction gear 33 of the actuator 30 to be driven by the motor 32. The detent plate 52 is connected to the manual shaft 51. The detent plate 52 and the manual shaft 51 are driven by the actuator 30. The detent plate 52 has a pin 54 projecting in parallel with the manual shaft 51. The pin 54 is connected to the manual valve 22. When the detent plate 52 and the manual shaft 51 rotate, the manual valve 22 reciprocates in its axial direction. That is, the gear mechanism 31 converts the rotational movement of the actuator 30 into a reciprocating movement of the manual valve 22.

Figure 4:
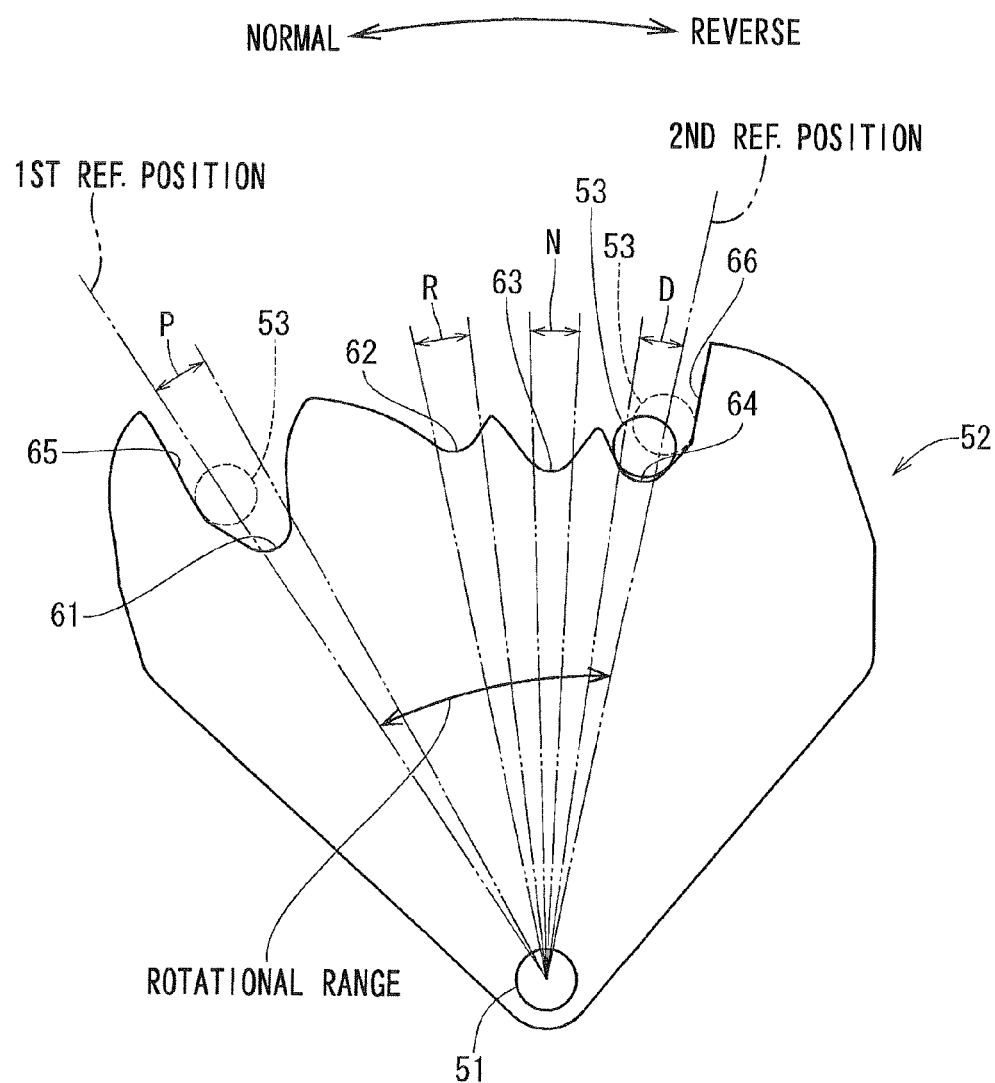
FIG. 4 is a front view showing a detent plate of the shift-by-wire system according to the first embodiment.

The detent plate 52, as shown in FIG. 4, has a first end concave portion 61, a first middle concave portion 62, a second middle concave portion 63, and a second end concave portion 64. The first end concave portion 61 is positioned at one end of the detent plate 52 in its rotational direction. The second end concave portion 64 is positioned at the other end of the detent plate 52 in its rotational direction. The first and the second middle concave portion 62, 63 are positioned between the first end concave portion 61 and the second end concave portion 64.

According to the present embodiment, the first end concave portion 61 is formed in such a manner as to correspond to the P-mode position of the automatic transmission 20. The first end concave portion 61 has a first wall 65. The first middle concave portion 62 is formed in such a manner as to correspond to the R-mode position of the automatic transmission 20. The second middle concave portion 64 is formed in such a manner as to correspond to the N-mode position of the automatic transmission 20. The second end concave portion 63 is formed in such a manner as to correspond to the D-mode position of the automatic transmission 20. The second end concave portion 64 has a second wall 66.

The detent spring 55 has a detent roller 53 at its tip end. The detent roller 53 functions as a regulating portion which regulates the rotation of the detent plate 52. When the rotational force is transmitted to the detent plate 52 through the manual shaft 51, the detent roller 53 moves between the concave portions 61, 62, 63 and 64. The actuator 30 rotates the manual shaft 51, so that the axial position of the manual valve 22 and the condition of the parking lock mechanism 70 are varied to change the mode position of the automatic transmission 20.

The detent roller 53 is engaged with one of the concave portions 61, 62, 63, and 64, whereby the rotation of the detent plate 52 is regulated and the axial position of the manual valve 22 and the condition of the parking lock mechanism 70 are defined. Thus, the mode position of the automatic transmission 20 is fixed.

In the present embodiment, as shown in FIG. 4, when the mode position is changed from the P-mode to the R-mode or from the N-mode to the D-mode, the rotational direction of the reduction gear 33 is defined as a normal direction. Meanwhile, when the mode position is changed from the D-mode to the N-mode or from the R-mode to the P-mode, the rotational direction of the reduction gear 33 is defined as a reverse direction.

As shown in FIG. 4, the rotatable range of the detent plate 52 is between a position where the detent roller 53 is in contact with the first wall 65 and a position where the detent roller 53 is in contact with the second wall 66.

FIG. 3 shows the parking lock mechanism 70 in which the mode position is the D-mode position. A parking gear 83 is not locked by a parking lock pole 82. Thus, the rotation of the wheels is not restricted. When the reduction gear 33 rotates in the reverse direction from the condition shown in FIG. 3, a rod 80 is biased in a direction shown by an arrow "X" through the detent plate 52 and a tapered portion 81 of the rod 80 pushes up the parking lock pole 82 in a direction shown by an arrow "Y". The parking lock pole 82 is engaged with the parking gear 83, whereby the rotation of the wheels is restricted. At this moment, the detent roller 53 is engaged with the first end concave portion 61 and the actual mode position of the automatic transmission 20 is the P-mode position.

The SBW-ECU 13 is electrically connected to the motor 32, the encoder 34, and a selector sensor 46 of a range selector 45. The selector sensor 46 detects a mode position which a driver commands through the range selector 45. The selector sensor 46 transmits the detected signal to the SBW-ECU 13.

The SBW-ECU 13 determines a target mode position according to the command signal outputted from the selector sensor 46. More specifically, the target mode position is determined based on the command signal from the selector sensor 46, a signal from a brake, and a signal from the vehicle speed sensor 24. The SBW-ECU 13 functions as a target mode position determining portion of the present invention.

The SBW-ECU 13 controls the actuator 30 in such a manner that the mode position of the automatic transmission 20 agrees with the target mode position. Thereby, the actual mode position of the automatic transmission 20 is brought into the mode position which the driver desires.

In the present embodiment, since the encoder 34 is an incremental type encoder, only the relative rotational position of the motor 32 can be detected. Thus, it is necessary to learn a reference position of the reduction gear 33 relative to an absolute position when the mode position is changed. After the reference position is learned, the rotational position of the actuator 30 relative to each mode position is computed based on the reference position and a specified rotational quantity (control constant). Then, the actuator 30 is driven so that its rotational position agrees with the computed rotational position. In the present embodiment, the SBW-ECU 13 learns the reference rotational position of the actuator 30 which corresponds to the P-mode position or the D-mode position.

Also, the SBW-ECU 13 can detect the actual mode position indirectly by performing a computation based on the reference rotational position, the specified rotational quantity and the count number of the pulse signals outputted from the encoder 34. In the present embodiment, the SBW-ECU 13 indicates the detected actual mode position on a display 47 through the integrated ECU 10. Thus, the driver can recognize the current actual mode position. In the present embodiment, when the center of the detent roller 53 is positioned in each concave portion 61, 62, 63, 64, the actual mode position can be detected based on the rotational position of the motor 32. The learning processing of the reference position of the actuator 30 will be described later.

The EC-ECU 14 is electrically connected to a throttle valve 41, a fuel injector 42, and an accelerator position sensor 44 of an accelerator pedal 43. The throttle valve 41 adjusts the intake air flow rate flowing through an intake passage of an engine 40. The fuel injector 42 injects the fuel into the intake passage or a cylinder of the engine 40. The accelerator position sensor 44 detects the accelerator position and outputs the detected signal to the EC-ECU 14. As above, the EC-ECU 14 controls the throttle valve 41 and the fuel injector 42 according to the accelerator position. The EC-ECU 14 controls the engine speed and the engine output torque.

A learning processing of the reference position of the actuator 30 by the SBW-ECU 13 will be described hereinafter. In the present embodiment, it is assumed that a first reference position and a second reference position are learned as the reference position of the actuator 30. The first reference position corresponds to a rotational position of the actuator 30 at which the detent roller 53 is in contact with the first wall 65. This position corresponds to the P-mode position. The second reference position corresponds to a rotational position of the actuator at which the detent roller 53 is in contact with the second wall 66.

When the SBW-ECU 13 performs a learning of the first reference position, the actuator 30 is driven in the reverse direction until the detent roller 53 is brought into contact with the first wall 65 (refer to FIG. 4). After the detent roller 53 is brought into contact with the first wall 65, the detent spring 55 starts to bend. Then, the SBW-ECU 13 detects that a maximum value or a minimum value of the count number of the pulse signals outputted from the encoder 34 does not change for a specified time period, whereby it is determined that the detent plate 52 and the motor 32 of the actuator 30 stop the rotation thereof. The SBW-ECU 13 stores the count number as a value corresponding to the first reference position in a random access memory (RAM) of the memory portion 15. Thereby, the learning of the first reference position of the actuator 30 is finished. The SBW-ECU 13 functions as a first position learning portion of the present invention.

The memory portion 15 previously stores a plurality of value which represents a rotation amount of the motor 32 from the first reference position to each mode position. This value will be referred to as a first specified value, hereinafter. After the SBW-ECU 13 learns the first reference position, the SBW-ECU 13 computes the rotational positions of the actuator 30 corresponding to each mode position (P-mode position, R-mode position, N-mode position, and D-mode position) based on the first reference position and the first specified value. The actuator 30 is driven to the computed rotational position, whereby a normal control condition in which the actual mode position is changed to the desired mode position can be obtained.

When the SBW-ECU 13 performs a learning of the second reference position, the actuator 30 is driven in the normal direction until the detent roller 53 is brought into contact with the second wall 66 (refer to FIG. 4). After the detent roller 53 is brought into contact with the second wall 66, the detent spring 55 starts to extend. Then, the SBW-ECU 13 detects that a maximum value or a minimum value of the count number of the pulse signals outputted from the encoder 34 does not change for a specified time period, whereby it is determined that the detent plate 52 and the motor 32 of the actuator 30 stop the rotation thereof. The SBW-ECU 13 stores the count number as a value corresponding to the second reference position in a random access memory (RAM) of the memory portion 15. Thereby, the learning of the second reference position of the actuator 30 is finished. The SBW-ECU 13 functions as a second position learning portion of the present invention.

The memory portion 15 previously stores a plurality of value which represents a rotation amount of the motor 32 from the second reference position to each mode position. This value will be referred to as a second specified value, hereinafter. After the SBW-ECU 13 learns the second reference position, the SBW-ECU 13 computes the rotational positions of the actuator 30 corresponding to each mode position (P-mode position, R-mode position, N-mode position, and D-mode position) based on the second reference position and the second specified value. The actuator 30 is driven to the computed rotational position, whereby a normal control condition in which the actual mode position is changed to the desired mode position can be obtained.

As described above, the SBW-ECU 13 performs the first reference position learning and the second reference position learning, whereby the shift-by-wire system 3 can be brought into the normal control condition. It should be noted that the first specified value and the second specified value are design values which are defined according to the shape of the detent plate 52 and the characteristic of the detent spring 55. Further, the first specified value and the second specified value are stored in the nonvolatile memories, such as ROM and EEPROM of the memory portion 15.

As described above, although the encoder 34 can not detect the absolute rotational position of the actuator 30, the SBW-ECU 13 learns the first reference position and the second reference position and computes the rotational position of the actuator 30 based on the first or the second reference position and the first or the second specified value. The actuator 30 is driven to the computed rotational position, whereby the actual mode position is changed to the desired mode position.

Figure 5:
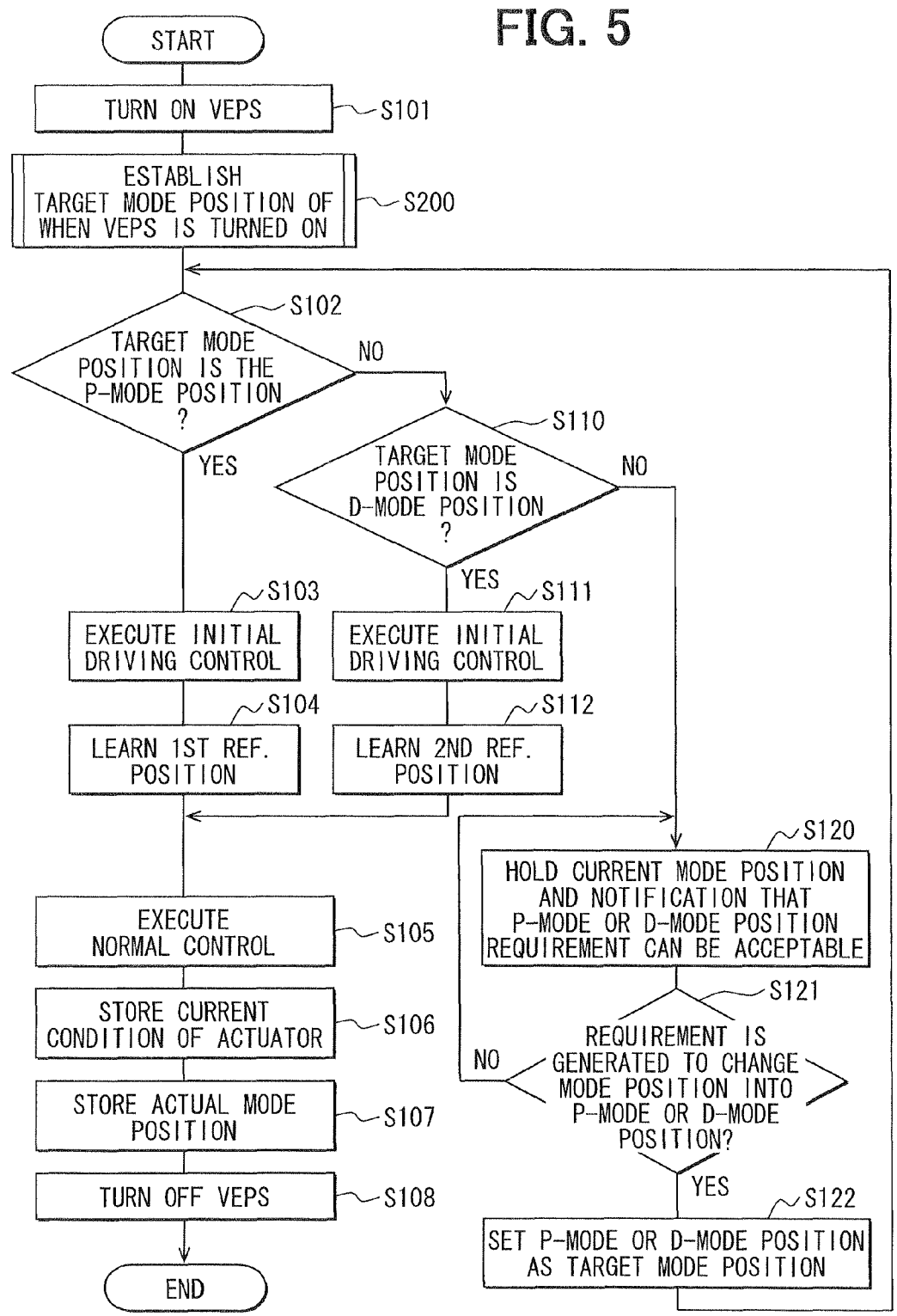
FIG. 5 is a flowchart showing a processing for learning a rotational position of an actuator according to the first embodiment.
Figure 6:
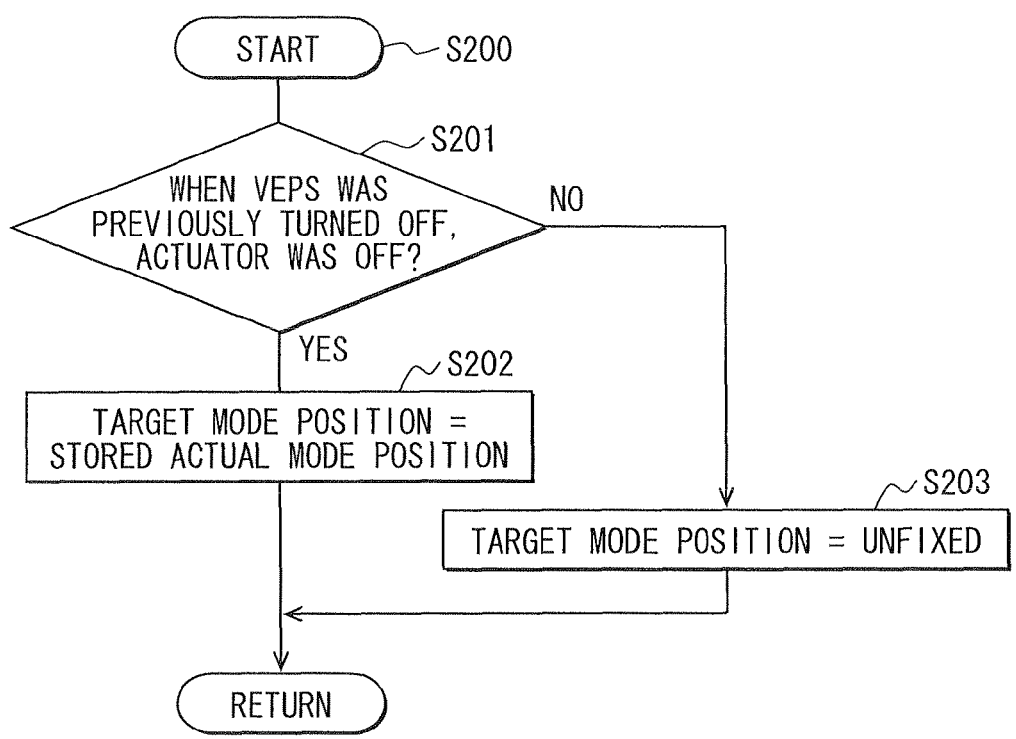
FIG. 6 is a flowchart showing a sub-processing of FIG. 5.

Referring to FIGS. 5 and 6, a learning processing of the reference position of the actuator 30 by the SBW-ECU 13 will be described hereinafter.

In step S101, the vehicle control system 1 is energized when the vehicle electric power source (VEPS) is turned on. The case in which the vehicle electric power source (VEPS) is turned on includes: a case in which a driver intentionally turns off an ignition switch and then turns on the ignition switch again; and a case in which the vehicle electric power is momentarily turned off without respect to the driver's intension and then automatically turned on.

In step S200, a target mode position of when the vehicle electric power is turned on is established. Referring to FIG. 6, a processing in step S200 will be described hereinafter. In S201, the SBW-ECU 13 determines whether the actuator 30 was off when the vehicle electric power source (VEPS) was previously turned off. The SBW-ECU 13 conducts this determination based on "condition of the actuator 30" which was stored when the vehicle electric power source (VEPS) was previously turned off. When the stored "condition of the actuator 30" indicates "OFF", the SBW-ECU 13 determines that the actuator 30 was off when the vehicle electric power source (VEPS) was previously turned off. When the stored "condition of the actuator 30" indicates "ON", the SBW-ECU 13 determines that the actuator 30 was not off when the vehicle electric power source (VEPS) was previously turned off. The processing for storing the "condition of the actuator 30" will be described later in detail.

When the answer is YES in step S201, the procedure proceeds to step S202. When the answer is NO in step S201, the procedure proceeds to step S203.

In step S202, the SBW-ECU 13 sets the actual mode position, which was stored when the vehicle power source was previously turned off, as a target mode position. The processing for storing the actual mode position will be described later.

In step S203, the SBW-ECU 13 sets the target mode position as "unfixed". That is, the target mode position has not been established. After the processing of step S200 is finished, the procedure proceeds to step S102.

In step S102, the SBW-ECU 13 determines whether the target mode position is the P-mode position, which corresponds to the first end concave portion 61, in view of the target mode position established in step S202 or S203. When the answer is YES in step S102, the procedure proceeds to step S103. When the answer is NO in step S102, the procedure proceeds to step S110.

In step S103, the SBW-ECU 13 executes an initial driving control of the actuator 30, whereby the rotation of the actuator 30 is appropriately controlled. Then, the procedure proceeds to step S104 in which the SBW-ECU 13 functions as a first position learning portion to learn a first reference position of the actuator 30. Then, the procedure proceeds to step S105.

In step S110, the SBW-ECU 13 determines whether the target mode position is the D-mode position, which corresponds to the second end concave portion 64, in view of the target mode position established in step S202 or S203. When the answer is YES in step S110, the procedure proceeds to step S111. When the answer is NO in step S110, the procedure proceeds to step S120.

In step S111, the SBW-ECU 13 executes an initial driving control of the actuator 30, whereby the rotation of the actuator 30 is appropriately controlled. Then, the procedure proceeds to step S112 in which the SBW-ECU 13 functions as a second position learning portion to learn a second reference position of the actuator 30. Then, the procedure proceeds to step S105.

In step S120, the SBW-ECU 13 does not drive the actuator 30 to hold the current actual mode position. Also, the SBW-ECU 13 and the integrated ECU 10 indicate to the driver that the P-mode position or the D-mode position can be acceptable by means of the display 47. Alternatively, the SBW-ECU 13 and the integrated ECU 10 may indicate to the driver that the P-mode position or the D-mode position can be acceptable by means of a speaker 48 electrically connected to the integrated ECU 10. It should be noted that the SBW-ECU 13, the integrated ECU 10, the display 47 and the speaker 48 function as a notify portion of the present invention.

If the SBW-ECU 13 determines that the driver requires that the mode position is changed to a position other than the P-mode position and the D-mode position based on the signal from the selector sensor 46 in step S120, the driver is notified that it is impossible to change the position to other than the P-mode position and the D-mode position by means of the speaker 48 or the display 47. It should be noted that the SBW-ECU 13, the integrated ECU 10, the speaker 48 and the display 47 function as a warning portion of the present invention.

In step S121, the SBW-ECU 13 determines, based on the signal from the selector sensor 46, whether a driver's requirement is generated to change the mode position into the P-mode position or the D-mode position. When the answer is YES in step S121, the procedure proceeds to step S122. When the answer is NO in step S121, the procedure goes back to step S120.

In step S122, the SBW-ECU 13 sets the P-mode position or the D-mode position as the target mode position. The SBW-ECU 13 functions as a target mode position determining portion which determines the target mode position based on the signal from the selector sensor 46, a brake signal, and a signal from the vehicle speed sensor 24. Then, the procedure goes back to step S102.

In step S105, the SBW-ECU 13 executes a normal control of the shift-by-wire system 3 (actuator 30). That is, the SBW-ECU 13 computes the position of the actuator 30 with respect to each mode position based on the first specified value stored in the memory portion 15 and the first reference position learned in step S104 or the second specified value stored in the memory portion 15 and the second reference position learned in step S112. Then, the SBW-ECU 13 drives the actuator 30 so that the position of the actuator 30 is brought into the computed position. In the above normal control, the SBW-ECU 13 functions as the target mode position determining portion which determines the target mode position based on the signal from the selector sensor 46, a brake signal, and a signal from the vehicle speed sensor 24 and controls the actuator 30 so that the mode position of the automatic transmission 20 agrees with the determined mode position.

In step S106, the SBW-ECU 13 stores the current condition of the actuator 30 in the memory portion 15. Specifically, when the condition of the actuator 30 is changed from "stop condition" to "operated condition", or when the condition of the actuator 30 is changed from "operated condition" to "stop condition", the condition of the actuator 30 stored in the memory portion 15 is updated. The condition of the actuator 30 is stored in the nonvolatile memories, such as ROM and EEPROM of the memory portion 15. It should be noted that the last-stored condition of the actuator 30 is referred in step S201 as the condition of the actuator of when the vehicle electric power source (VEPS) is turned off.

In step S107, the SBW-ECU 13 detect the actual mode position by performing a computation based on the first or the second reference position, the first or the second specified value, and the count number of the pulse signals outputted from the encoder 34. This detected actual mode position is stored in the memory portion 15. Specifically, when the actual mode position is changed by driving the actuator 30, the actual mode position stored in the memory portion 15 is updated. The actual mode position is stored in the nonvolatile memories, such as ROM and EEPROM of the memory portion 15. It should be noted that the last-stored actual mode position is referred in step S202 as the actual mode position of when the vehicle electric power source (VEPS) is turned off.

When the vehicle electric power source (VEPS) is turned off in step S108, the processing shown in FIG. 5 is terminated. The case in which the vehicle electric power source (VEPS) is turned off includes: a case in which a driver intentionally turns off an ignition switch; and a case in which the vehicle electric power is momentarily turned off without respect to the driver's intension. Even though the vehicle electric power source (VEPS) is turned off, the condition of the actuator 30 and the actual mode position stored in the memory portion 15 in steps S106 and S107 are not erased.

The SBW-ECU 13 functions as a target mode position establishing portion in steps S200 to S203. Further, the SBW-ECU 13 functions as a memory portion in steps S106 and S107.

As explained above, according to the present embodiment, the SBW-ECU 13 learns the first and the second reference position of the actuator 30, whereby the rotational position of the actuator 30 with respect to each mode position (P-mode, R-mode, N-mode, D-mode) is computed based on the stored first and second specified values and the stored first and second reference positions. The actuator 30 is driven so that its rotational position agrees with the computed rotational position. Thus, the actual mode position can be brought into the desired mode position.

Further, according to the present embodiment, in a case that the vehicle electric power source (VEPS) is turned off while the actual mode position is the P-mode position and then the target mode position is the P-mode position when the vehicle electric power source (VEPS) is turned on, the first position learning portion learns the first reference position. Usually, when the actual mode position is the P-mode position, it is assumed that the vehicle is stopped. Therefore, even though the learning of the first reference position is started after the vehicle electric power source (VEPS) is momentarily turned off, the actual mode position is kept at the P-mode position, whereby the first reference position can be learned safely and the normal control condition can be executed.

Further, in a case that the vehicle electric power source (VEPS) is turned off while the actual mode position is the D-mode position and then the target mode position is the D-mode position when the vehicle electric power source (VEPS) is turned on, the second position learning portion learns the second reference position. Usually, when the actual mode position is the D-mode position, it is assumed that the vehicle is running. Therefore, even though the learning of the second reference position is started after the vehicle electric power source (VEPS) is momentarily turned off, the actual mode position is kept at the D-mode position, whereby the second reference position can be learned safely and the normal control condition can be executed.

Further, when the vehicle electric power source (VEPS) is turned off at the time when the actual mode position is other than the P-mode position or the D-mode position and then the vehicle electric power source (VEPS) is turned on, and when the target mode position is other than the P-mode position and the D-mode position or the target mode position is unfixed, the SBW-ECU 13 does not drive the actuator 30 so that the current actual mode position is maintained. The SBW-ECU 13 accepts only the driver's requirement for changing the mode position to the P-mode position or the mode position corresponding to the second end concave portion 64 (D-mode position). When it is required to change the mode position to the P-mode position, the first position learning portion learns the first reference position. When it is required to change the mode position to the mode position corresponding to the second end concave portion 64 (D-mode position), the second position learning portion learns the second reference position.

According to the above configuration, when the actual mode position of before the vehicle electric power source (VEPS) is momentarily turned off is other than the P-mode position and the mode position corresponding to the second end concave portion 64 (D-mode position), or when the actual mode position is unfixed, the actual mode position of before the vehicle electric power source (VEPS) is momentarily turned off is maintained without learning the first reference position and the second reference position. Thus, in the automatic transmission 20 having four mode positions, for example, even if the vehicle electric power source (VEPS) is momentarily turned off while the actual mode position is the N-mode position, the actual mode position is maintained at the N-mode position even after the vehicle electric power source (VEPS) is turned on, whereby following matters can be avoided. That is, it can be avoided that an unintentional reverse torque is generated when the actual mode position is changed to the P-mode position through the R-mode position so as to learn the first reference position. It can be avoided that the parking lock mechanism 70 is damaged or the vehicle is suddenly stopped due to a sudden mode position change into the P-mode position while the vehicle is running. When the second reference position is learned, it can be avoided that the actual mode position is brought into the D-mode position and the unintentional forward torque is generated.

Furthermore, when the vehicle electric power is momentarily turned off while the actual mode position is the R-mode position, the actual mode position is maintained at the R-mode position even after the vehicle electric power is turned on, whereby it can be avoided that the vehicle is suddenly stopped when the actual mode position is changed to the P-mode position so as to learn the first reference position. Also, it can be avoided that the actual mode position is brought into the D-mode position and the vehicle runs forward unintentionally.

As described above, according to the shift-by-wire system 3 of the present embodiment, even if the vehicle electric power source (VEPS) is momentarily turned off, the normal control can be safely recovered. Further, according to the present embodiment, since the incremental type encoder 34 is employed to detect the rotational position of the actuator 30, the configuration of the system 3 can be simplified.

Furthermore, according to the present embodiment, the SBW-ECU 13 functions as a notification portion which notifies the driver of the situation where the mode position can be changed into only the P-mode position or the mode position corresponding to the second end concave portion 64 (D-mode position). In a case that the target mode position is other than the P-mode position and the mode position corresponding to the second end concave portion 64 (D-mode position) or the target mode position is unfixed when the vehicle electric power source (VEPS) is turned on, the actual mode position can be changed into only the P-mode position or the mode position corresponding to the second concave portion 64 (D-mode position). At this time, since the notification portion notifies the driver of the situation where the mode position can be changed into only the P-mode position or the mode position corresponding to the second end concave portion 64 (D-mode position), it can be avoided that the driver is confused.

Further, when it is required to change the mode position into other than the P-mode position and the mode position corresponding to the second end concave portion 64 (D-mode position), the SBW-ECU 13 functions as the warning portion which notifies the driver of the situation where the mode position can not be changed into other than the P-mode position and the mode position corresponding to the second end concave portion 64 (D-mode position). When the target mode position of when the vehicle electric power source (VEPS) is turned on is other than the P-mode position and the mode position corresponding to the second end concave portion 64 (D-mode position), or when the target mode position is unfixed, the actual mode position can be changed into only the P-mode position or the mode position corresponding to the second concave portion 64 (D-mode position). At this moment, if the drive requests to change the mode position into other than the P-mode position and the mode position corresponding to the second end concave portion 64 (D-mode position), the warning portion notifies the driver of the situation where the mode position can not be changed into other than the P-mode position and the mode position corresponding to the second end concave portion 64 (D-mode position), whereby it can be avoided that the driver is confused.

Also, the SBW-ECU 13 functions as a memory portion and a target mode position establishing determining portion. The memory portion stores the condition of the actuator 30 and the actual mode position of when the vehicle electric power source (VEPS) is turned off. In a case that the actuator 30 is at the stop condition when the vehicle electric power source (VEPS) is turned on, the target mode position establishing portion sets the actual mode position stored in the memory portion as the target mode position. In a case that the actuator 30 is at the operated condition, the target mode position is established as "unfixed".

According to the present embodiment, since the target mode position establishing portion establishes the target mode position of when the vehicle electric power source (VEPS) is turned on according to the condition of the actuator of when the vehicle electric power source (VEPS) is turned off, it can be avoided that the actual mode position is different from the target mode position when the vehicle electric power source (VEPS) is turned on after the vehicle electric power source (VEPS) is momentarily turned off while the mode position is changing.

Second Embodiment

Figure 7:
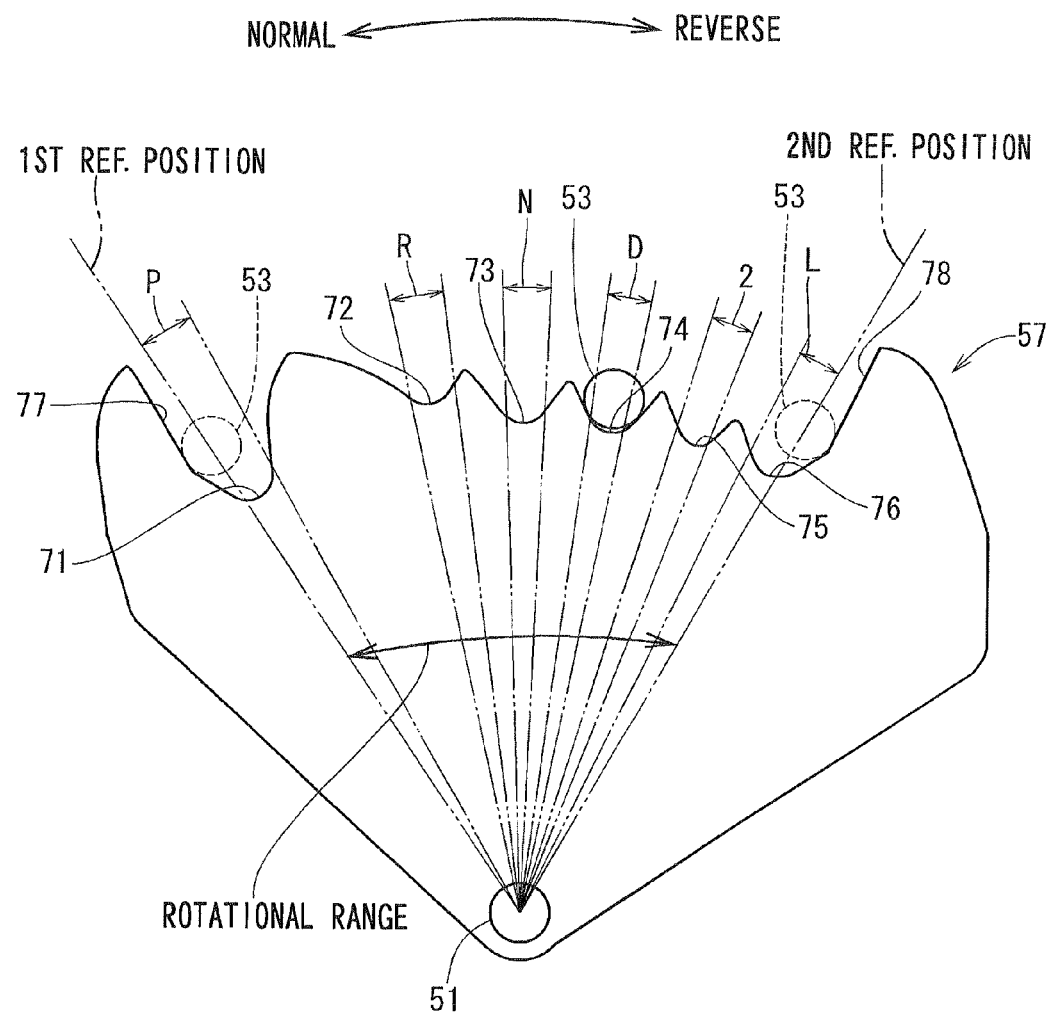
FIG. 7 is a front view showing a detent plate of the shift-by-wire system according to a second embodiment.

FIG. 7 shows a detent plate of the shift-by-wire system according to a second embodiment. The configuration of the detent plate is different from that in the first embodiment.

As shown in FIG. 7, the detent plate 57 has a first end concave portion 71, a first middle concave portion 72, a second middle concave portion 73, a third middle concave portion 74, a fourth middle concave portion 75 and a second end concave portion 76. The first end concave portion 71 is positioned at one end of the detent plate 57 in its rotational direction. The second end concave portion 76 is positioned at the other end of the detent plate 57 in its rotational direction. The first to the fourth middle concave portion 72 to 75 are positioned between the first end concave portion 71 and the second end concave portion 76.

According to the present embodiment, the first end concave portion 71 is formed in such a manner as to correspond to the P-mode position of the automatic transmission 20. The first end concave portion 71 has a first wall 77. The first middle concave portion 72 is formed in such a manner as to correspond to the R-mode position of the automatic transmission 20. The second middle concave portion 73 is formed in such a manner as to correspond to the N-mode position of the automatic transmission 20. The third middle concave portion 74 is formed in such a manner as to correspond to the D-mode position of the automatic transmission 20. The fourth middle concave portion 75 is formed in such a manner as to correspond to the Second-D-mode position of the automatic transmission 20. The second end concave portion 76 is formed in such a manner as to correspond to the Low-D-mode position of the automatic transmission 20. The second end concave portion 76 has a second wall 78.

As above, the automatic transmission 20 has the P-mode position, the R-mode position, the N-mode position, the D-mode position, the second-D-mode position, and the Low-D-mode position.

In the present embodiment, as shown in FIG. 7, when the mode position is changed from the P-mode to the L-mode, the rotational direction of the reduction gear 33 is defined as a normal direction. Meanwhile, when the mode position is changed from the L-mode to the P-mode, the rotational direction of the reduction gear 33 is defined as a reverse direction.

As shown in FIG. 7, the rotatable range of the detent plate 57 is between a position where the detent roller 53 is in contact with the first wall 77 and a position where the detent roller 53 is in contact with the second wall 78.

A processing for learning the first reference position and the second reference position is the same as the first embodiment. That is, according to the second embodiment, the SBW-ECU 13 learns the first and the second reference position of the actuator 30, whereby the rotational position of the actuator 30 with respect to each mode position (P-mode, R-mode, N-mode, D-mode, Second-D-mode, Low-D-mode) is computed based on the stored first and second specified values and the stored first and second reference positions. The actuator 30 is driven to the computed rotational position, whereby the actual mode position is changed to the desired mode position.

For example, in a case that the vehicle electric power source (VEPS) is turned off while the actual mode position is the P-mode position and then the target mode position is the P-mode position when the vehicle electric power source (VEPS) is turned on, the first position learning portion learns the first reference position. Usually, when the actual mode position is the P-mode position, it is assumed that the vehicle is stopped. Therefore, even though the learning of the first reference position is started after the vehicle electric power source (VEPS) is momentarily turned off, the actual mode position is kept at the P-mode position, whereby the first reference position can be learned safely and the normal control condition can be executed.

Further, in a case that the vehicle electric power source (VEPS) is turned off while the actual mode position is the Low-D-mode position and then the target mode position is the Low-D-mode position when the vehicle electric power source (VEPS) is turned on, the second position learning portion learns the second reference position. Usually, when the actual mode position is the L-D-mode position, it is assumed that the vehicle is running. Therefore, even though the learning of the second reference position is started after the vehicle electric power source (VEPS) is momentarily turned off, the actual mode position is kept at the Low-D-mode position, whereby the second reference position can be learned safely and the normal control condition can be executed.

Further, when the vehicle electric power source (VEPS) is turned off while the actual mode position is other than the P-mode position and the Low-D-mode position, and then the vehicle electric power source (VEPS) is turned on, if the target mode position is other than the P-mode position and the Low-D-mode position or the target mode position is unfixed, the SBW-ECU 13 does not drive the actuator 30 so that the current actual mode position is maintained. The SBW-ECU 13 accepts only the driver's requirement for changing the mode position to the P-mode position or the mode position corresponding to the second end concave portion 76 (Low-D-mode position). When it is required to change the mode position to the P-mode position, the first position learning portion learns the first reference position. When it is required to change the mode position to the mode position corresponding to the second end concave portion 64 (D-mode position), the second position learning portion learns the second reference position.

According to the above configuration, when the actual mode position of before the vehicle electric power source (VEPS) is momentarily turned off is other than the P-mode position and the mode position corresponding to the second end concave portion 76 (Low-D-mode position), or when the actual mode position is unfixed, the actual mode position of before the vehicle electric power source (VEPS) is momentarily turned off is maintained without learning the first reference position and the second reference position. Thus, in the automatic transmission 20 having six mode positions, for example, even if the vehicle electric power source (VEPS) is momentarily turned off while the actual mode position is the N-mode position, the actual mode position is maintained at the N-mode position even after the vehicle electric power source (VEPS) is turned on, whereby following matters can be avoided. That is, it can be avoided that an unintentional reverse torque is generated when the actual mode position is changed to the P-mode position through the R-mode position so as to learn the first reference position. It can be avoided that the parking lock mechanism 70 is damaged or the vehicle is suddenly stopped due to a sudden mode position change into the P-mode position while the vehicle is running. When the second reference position is learned, it can be avoided that the actual mode position is brought into the D-mode position (Second-D-mode position, Low-D-mode position) and the unintentional forward torque is generated. Furthermore, when the vehicle electric power is momentarily turned off while the actual mode position is the R-mode position, the actual mode position is maintained at the R-mode position even after the vehicle electric power is turned on, whereby it can be avoided that the vehicle is suddenly stopped when the actual mode position is changed to the P-mode position so as to learn the first reference position. When the second reference position is learned, it can be avoided that the actual mode position is brought into the D-mode position (Second-D-mode position, Low-D-mode position) and the vehicle unintentionally runs forward.

As described above, according to the shift-by-wire system 3 of the present embodiment, even if the vehicle electric power source (VEPS) is momentarily turned off, the normal control can be safely recovered.

Third Embodiment

Figure 8:
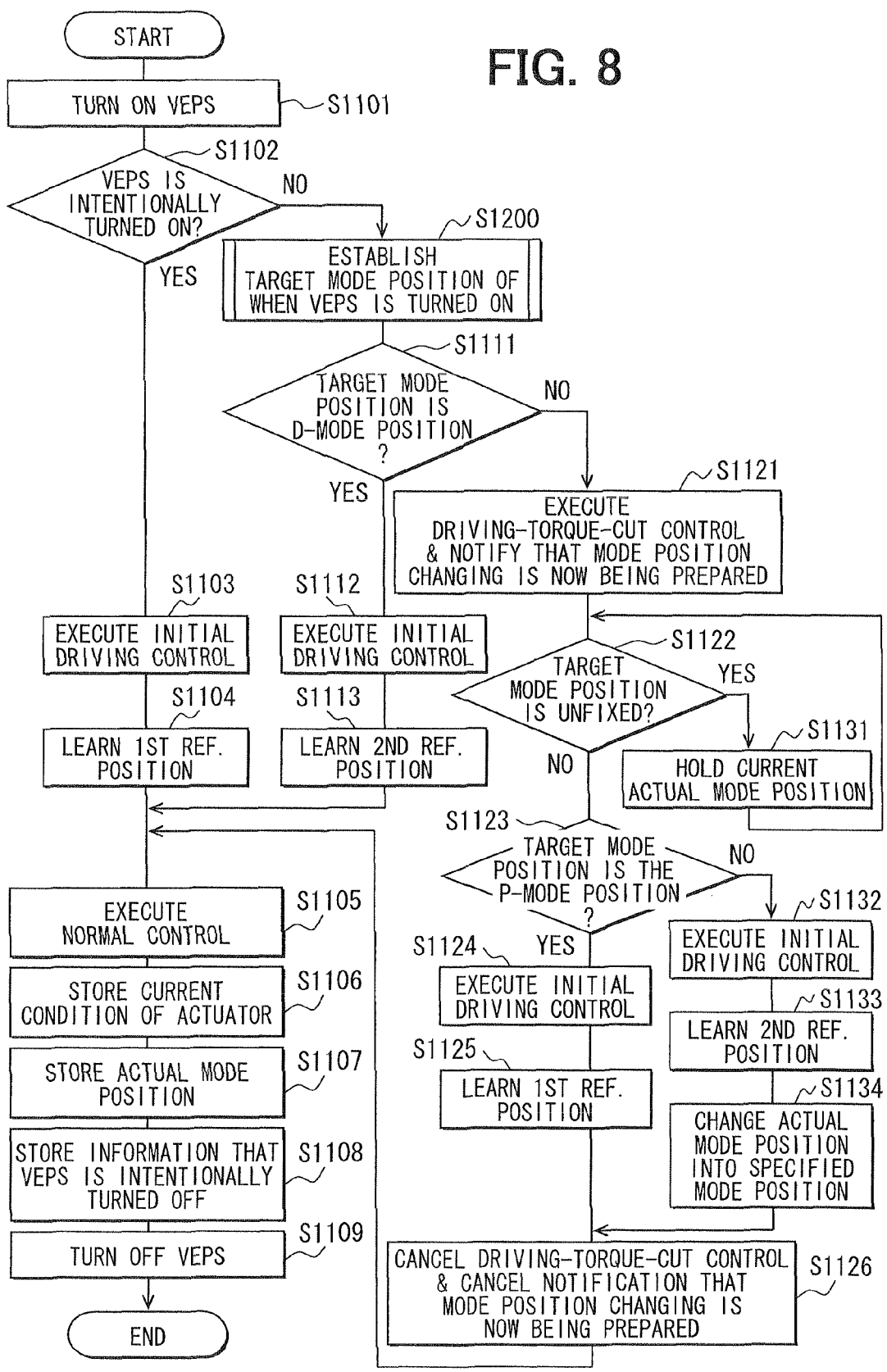
FIG. 8 is a flowchart showing a processing for learning a rotational position of an actuator according to a third embodiment.

Referring to FIG. 8, a learning processing of the reference position of the actuator 30 by the SBW-ECU 13 will be described hereinafter.

In step S1101, the vehicle control system 1 is energized when the vehicle electric power source (VEPS) is turned on. The case in which the vehicle electric power source (VEPS) is turned on includes: a first case in which a driver intentionally turns off an ignition switch and then turns on the ignition switch again; and a second case in which the vehicle electric power is momentarily turned off without respect to the driver's intension and then automatically turned on.

In step S1102, the SBW-ECU 13 determines whether it is the first case or the second case. The SBW-ECU 13 conducts this determination based on "information about vehicle electric power source (VEPS) condition" which was stored in the memory portion 15 when the vehicle electric power source (VEPS) was previously turned off. The SBW-ECU 13 and the memory portion 15 function as a power source determining portion. The processing for storing the information about vehicle electric power source (VEPS) condition will be described later in step S1108.

When the answer is YES in step S1102, the procedure proceeds to step S1102. When the answer is NO in step S1102, the procedure proceeds to step S1200. Before the procedure proceeds to step S1103 or S1200, the information about vehicle electric power source (VEPS) is erased.

In step S1103, the SBW-ECU 13 executes an initial driving control of the actuator 30, whereby the rotation of the actuator 30 is appropriately controlled. Then, the procedure proceeds to step S1104 in which the SBW-ECU 13 functions as a first position learning portion which learns a first reference position of the actuator 30. Then, the procedure proceeds to step S1105.

In step S1200, a target mode position of when the vehicle electric power is turned on is established. The processing in step S1200 is the same as the processing in step S200 shown in FIGS. 5 and 6.

After the processing of step S1200 is finished, the procedure proceeds to step S1111.

In step S1111, the SBW-ECU 13 determines whether the target mode position is the D-mode position, which corresponds to the second end concave portion 64, in view of the target mode position established in step S202 or S203. When the answer is YES in step S1111, the procedure proceeds to step S112. When the answer is NO in step S1111, the procedure proceeds to step S1121.

In step S1112, the SBW-ECU 13 executes an initial driving control of the actuator 30, whereby the rotation of the actuator 30 is appropriately controlled. Then, the procedure proceeds to step S1113 in which the SBW-ECU 13 functions as a second position learning portion which learns a second reference position of the actuator 30. Then, the procedure proceeds to step S1105.

In S1121, the SBW-ECU 13 executes a neutral control of the transmission to intercepts a transmission of driving torque from the engine 40 to wheels of the vehicle. That is, the SBW-ECU 13 starts to execute a driving-torque-cut control. The SBW-ECU 13 and the transmission of the vehicle functions as a torque control portion.

Also, the SBW-ECU 13 and the integrated ECU 10 indicate to the driver that a requirement for changing the mode position can not be accepted because the mode position changing is now being prepared, by means of the display 47. Alternatively, the SBW-ECU 13 and the integrated ECU 10 may indicate to the driver that the P-mode position or the D-mode position are unacceptable by means of a speaker 48 electrically connected to the integrated ECU 10. It should be noted that the SBW-ECU 13, the integrated ECU 10, the display 47 and the speaker 48 function as a first notification portion of the present invention.

If the SBW-ECU 13 determines, based on the signal from the selector sensor 46, that the driver requires to change the mode position, the driver is notified that it is unacceptable to change the mode position by means of the speaker 48 or the display 47. It should be noted that the SBW-ECU 13, the integrated ECU 10, the speaker 48 and the display 47 function as a warning portion of the present invention.

In step S1122, the SBW-ECU 13 determines whether the target mode position is unfixed. When the answer is YES in step S1122, the procedure proceeds to step S1131. When the answer is NO in step S1122, the procedure proceeds to step S1123.

In step S1131, the SBW-ECU 13 does not drive the actuator 30 to hold the current actual mode position. Then, the procedure goes back to step S1122. In step S1123, the SBW-ECU 13 determines whether the target mode position is the P-mode position, which corresponds to the first end concave portion 61. When the answer is YES in step S1123, the procedure proceeds to step S1124. When the answer is NO in step S1123, the procedure proceeds to step S1132.

In step S1124, the SBW-ECU 13 executes an initial driving control of the actuator 30, whereby the rotation of the actuator 30 is appropriately controlled. Then, the procedure proceeds to step S1125 in which the SBW-ECU 13 functions as a first position learning portion which learns a first reference position of the actuator 30. Then, the procedure proceeds to step S1126.

In step S1132, the SBW-ECU 13 executes an initial driving control of the actuator 30, whereby the rotation of the actuator 30 is appropriately controlled. Then, the procedure proceeds to step S1133 in which the SBW-ECU 13 functions as a second position learning portion which learns a second reference position of the actuator 30. Then, the procedure proceeds to step S1134.

In step S1134, the SBW-ECU 13 sets the target mode position defined in step S202 or after step S1131 as a specified mode position. Then, the SBW-ECU 13 drives the actuator so that the mode position is brought into the specified mode position. Then, the procedure proceeds to step S1126.

In S1126, the SBW-ECU 13 permits the transmission of the driving torque from the engine 40 to the wheels. That is, the driving-torque-cut control is terminated.

Besides, the notification by the first notification portion and the warning by the warning portion are terminated. Further, the SBW-ECU 13 and the integrated ECU 10 indicate to the driver that it is acceptable to change the mode position by means of the display 47 or the speaker 48. It should be noted that the SBW-ECU 13, the integrated ECU 10, the display 47 and the speaker 48 function as a second notification portion of the present invention.

In step S1105, the SBW-ECU 13 executes a normal control of the shift-by-wire system 3 (actuator 30). That is, the SBW-ECU 13 computes the position of the actuator 30 with respect to each mode position based on the first specified value stored in the memory portion 15 and the first reference position learned in step S1104 or S1125, or the second specified value stored in the memory portion 15 and the second reference position learned in step S1113 or S1133. Then, the SBW-ECU 13 drives the actuator 30 so that the position of the actuator 30 is brought into the computed position. In the above normal control, the SBW-ECU 13 functions as the target mode position determining portion which determines the target mode position based on the signal from the selector sensor 46, a brake signal and a signal from the vehicle speed sensor 24, and controls the actuator 30 so that the mode position of the automatic transmission 20 agrees with the determined mode position.

In step S1106, the SBW-ECU 13 stores the current condition of the actuator 30 in the memory portion 15. Specifically, when the condition of the actuator 30 is changed from "stop condition" to "operated condition", or when the condition of the actuator 30 is changed from "operated condition" to "stop condition", the condition of the actuator 30 stored in the memory portion 15 is updated. The condition of the actuator 30 is stored in the nonvolatile memories, such as ROM and EEPROM of the memory portion 15. It should be noted that the last-stored condition of the actuator 30 is referred in step S201 as the condition of the actuator of when the vehicle electric power source (VEPS) is turned off.

In step S1107, the SBW-ECU 13 detect the actual mode position by performing a computation based on the first or the second reference position, the first or the second specified value, and the count number of the pulse signals outputted from the encoder 34. This detected actual mode position is stored in the memory portion 15. Specifically, when the actual mode position is changed by driving the actuator 30, the actual mode position stored in the memory portion 15 is updated. The actual mode position is stored in the nonvolatile memories, such as ROM and EEPROM of the memory portion 15. It should be noted that the last-stored actual mode position is referred in step S202 as the actual mode position of when the vehicle electric power source (VEPS) is turned off.

In S1108, the memory portion 15 stores information that the vehicle electric power source (VEPS) is intentionally turned off by a driver if so. This information about the vehicle electric power source (VEPS) is stored in the nonvolatile memories, such as EEPROM of the memory portion 15. It should be noted that the last-stored information about vehicle electric power source (VEPS) is referred in step S1102 as the information for determining whether it is the first case or the second case.

When the vehicle electric power source (VEPS) is turned off in step S1109, the processing shown in FIG. 7 is terminated. The case in which the vehicle electric power source (VEPS) is turned off includes: the first case in which a driver intentionally turns off an ignition switch; and a second case in which the vehicle electric power source (VEPS) is momentarily turned off without respect to the driver's intension. Even though the vehicle electric power source (VEPS) is turned off in step S1109, the condition of the actuator 30, the actual mode position and the information about vehicle electric power source (VEPS) stored in the memory portion 15 in steps S1106 to S1108 are not erased.

As explained above, according to the present embodiment, the SBW-ECU 13 learns the first and the second reference position of the actuator 30, whereby the rotational position of the actuator 30 with respect to each mode position (P-mode, R-mode, N-mode, D-mode) is computed based on the stored first and second specified values and the stored first and second reference positions. The actuator 30 is driven to the computed rotational position, whereby the actual mode position is changed to the desired mode position.

Also, the SBW-ECU 13 functions as a power source determining portion which determines whether the first case in which a driver intentionally turns off an ignition switch and then turns on the ignition switch again or the second case in which the vehicle electric power is momentarily turned off without respect to the driver's intension and then automatically turned on.

When it is determined that the vehicle electric power source (VEPS) is intentionally turned on by a driver, the first position learning portion learns the first reference position. Usually, in this case, it is assumed that the actual mode position is the P-mode position and the vehicle is stopped. Therefore, even though the learning of the first reference position is started at this moment, the actual mode position is kept at the P-mode position, whereby the first reference position can be learned safely and the normal control condition can be executed. Further, in a case that the vehicle electric power source (VEPS) is unintentionally turned off while the actual mode position is other than the P-mode range and then the vehicle electric power source (VEPS) is intentionally turned on by a driver, even if the learning of the first reference position is started and the wheels are locked, there is no problem because the vehicle is stopped.

According to the present embodiment, the system is provided with a torque control portion which can intercept a transmission of a driving torque from the engine to the wheels. When it is determined that the vehicle electric power source (VEPS) is turned on after unintentionally turned off, the torque control portion intercepts the transmission of the driving torque and makes impossible to receive a requirement for changing the mode position. And then, the first or the second position learning portion learns the first or the second reference position, and the mode position is changed to the specified mode position. At the same time, the interception of the torque transmission is canceled so as to make possible to receive the requirement for changing the mode position.

According to the above configuration, after the torque control portion intercepts the transmission of the driving torque and it is made impossible to receive a requirement for changing the mode position, the leaning of the first or the second reference position is executed. In the automatic transmission 20 having four mode positions, for example, if the vehicle electric power source (VEPS) is momentarily turned off while the actual mode position is the N-mode position, the driving torque transmission to the wheels is intercepted. Thus, it can be avoided that an unintentional reverse torque is generated when the actual mode position is changed to the P-mode position through the R-mode position so as to learn the first reference position. Further, when the second reference position is learned, it can be avoided that the actual mode position is brought into the D-mode position and the unintentional forward torque is generated. Furthermore, when the vehicle electric power is momentarily turned off while the actual mode position is the R-mode position, the torque transmission to the wheels is intercepted, whereby it can be avoided that the actual mode position is brought into the D-mode position and the vehicle runs forward unintentionally.

As described above, according to the shift-by-wire system of the present embodiment, even if the vehicle electric power source (VEPS) is momentarily turned off, the normal control can be safely recovered.

Furthermore, according to the present embodiment, the SBW-ECU 13 functions as a first notification portion which notifies the driver of the situation where it is impossible to receive a requirement for changing the mode position. When it is determined that the vehicle electric power source (VEPS) is turned on after unintentionally turned off, a requirement for changing the mode position is unacceptable. At this time, since the first notification portion notifies the driver of the situation where it is impossible to receive a requirement for changing the mode position, it can be avoided that the driver is confused.

Furthermore, according to the present embodiment, the SBW-ECU 13 functions as a warning portion which notifies the driver of the situation where it is impossible to change the mode position. When it is determined that the vehicle electric power source (VEPS) is turned on after unintentionally turned off, a requirement for changing the mode position is unacceptable. At this time, since the warning portion notifies the driver of the situation where it is impossible to change the mode position, it can be avoided that the driver is confused.

Furthermore, according to the present embodiment, the SBW-ECU 13 functions as a second notification portion which notifies the driver of the situation where it becomes possible to receive a requirement for changing the mode position. After learning of the first or the second reference position, the second notification portion notifies the driver of the situation where it becomes possible to receive a requirement for changing the mode position, whereby a driver can be relieved earlier.

Also, the SBW-ECU 13 functions as the torque control portion which shifts the transmission gear to the neutral mode position. Since the transmission gear mechanism is utilized as the torque control portion, an increase in manufacturing cost is restricted.

Also, the SBW-ECU 13 functions as a memory portion and a target mode position establishing determining portion. The memory portion stores the condition of the actuator 30 and the actual mode position of when the vehicle electric power source (VEPS) is turned off. In a case that the actuator 30 is at the stop condition when the vehicle electric power source (VEPS) is turned on, the target mode position establishing portion sets the actual mode position stored in the memory portion as the target mode position. In a case that the actuator 30 is at the operated condition, the target mode position is established as "unfixed".

In a case that the established target mode position is other than "unfixed", the SBW-ECU 13 set the target mode position as the specified mode position. Thereby, the specified mode position to which the mode position is changed after the momentarily tuning off can be established promptly. Even if the vehicle electric power source (VEPS) is momentarily turned off, the condition of the vehicle is recovered promptly to the condition of before momentarily turned off.

Meanwhile, in a case that the established target mode position is "unfixed", the SBW-ECU 13 sets the target mode position as the specified mode position. Until the target mode position is fixed, the actuator 30 is not driven so that the current actual mode position is maintained. Thus, it can be avoided that the actual mode position is different from the target mode position of when the vehicle electric power source (VEPS) is turned on after the vehicle electric power source (VEPS) is momentarily turned off.

According to the present embodiment, the SBW-ECU 13 determines whether the first reference position is learned or the second reference position is learned based on the target mode position of when the vehicle electric power source (VEPS) is turned on. In a case that the target mode position is the P-mode position, the first position learning portion learns the first reference position. Meanwhile, in a case that the target mode position is other than the P-mode position, the second position learning portion learns the second reference position.

According to the above configuration, in a case that the target mode position of when the vehicle electric power source (VEPS) is turned on is the P-mode position, the second reference position is not learned and the first reference position is learned. Thus, it can be avoided that the parking lock is suddenly released while the vehicle is parked in the P-mode position. In a case that the target mode position of when the vehicle electric power source (VEPS) is turned on is the R-mode position, the first reference position is not learned and the second reference position is learned. Thus, it can be avoided that the wheels are suddenly locked while the vehicle is running in the R-mode position.

As above, the first reference position and the second reference position can be safely learned.

Further according to the present embodiment, when the vehicle electric power source (VEPS) is turned on, the SBW-ECU 13 determines the vehicle electric power source (VEPS) is turned on after unintentionally turned off. At this time, if the target mode position is the D-mode position, the transmission of the driving torque to the wheel is not intercepted. In a case that the vehicle electric power source (VEPS) is momentarily turned off while the actual mode position is the D-mode position, the transmission of the driving torque to the wheel is not intercepted. Thus, while the vehicle is running in the D-mode position, a momentary torque interception does not occur and the reference mode position can be learned.

In performing the above described learning processing of the reference position of the actuator 30, the detent plate shown in FIG. 7 can be also employed. The configuration of the detent plate is different from that in the first embodiment.

Other Embodiment

A throttle valve which adjusts the intake air flow rate can be used as the torque control portion. The throttle valve can reduce the transmission of the driving torque to the wheels. In a case that the driving torque is generated by an electric driving motor (an electric vehicle, a hybrid vehicle), a control switch for supplying electricity to the driving motor can be used as the torque control portion.

In the above embodiment, when the target mode position is the P-mode position, the first reference position is learned. When the target mode position is other than the P-mode position, the second reference position is learned. Meanwhile, based on the mode position other than the P-mode position, it can be determined whether the first reference position is learned or the second reference position is learned.

In the above embodiment, when the target mode position is the P-mode position, only the first reference position is learned. Meanwhile, in addition to the first reference position, the second reference position may be learned, whereby the actuator 30 can be controlled more precisely. Since the driving torque to the wheel is intercepted or reduced by the torque control portion when the target mode position is the P-mode position, the second reference position can be learned safely even when the actual mode position is the p-mode position. It should be noted that it is unsafe to learn the first reference position while the vehicle is running. Thus, the first reference position should be learned after it is confirmed that the vehicle is stopped.

When the vehicle electric power source (VEPS) is turned on after the momentarily turned off, the torque control portion may always intercepts the torque transmission to learn the first reference position and the second reference position.

Fourth Embodiment

In a fourth embodiment, the SBW-ECU 13 learns the reference rotational position of the actuator 30 which corresponds to the P-mode position.

Also, the SBW-ECU 13 can detect the actual mode position indirectly by performing a computation based on the reference rotational position, the specified rotational quantity and the count number of the pulse signals outputted from the encoder 34. In the present embodiment, the SBW-ECU 13 indicates the detected actual mode position on a display 47 through the integrated ECU 10. Thus, the driver can recognize the current actual mode position.

In the present embodiment, when the center of the detent roller 53 is positioned in each concave portion 61, 62, 63, 64, the actual mode position can be detected based on the rotational position of the motor 32. The learning processing of the reference position of the actuator 30 will be described In the present embodiment, it is assumed that a first reference position is learned as the reference position of the actuator 30. The first reference position corresponds to a rotational position at which the detent roller 53 is in contact with the first wall 65. This position corresponds to the P-mode position.

When the SBW-ECU 13 performs a learning of the first reference position, the actuator 30 is driven in the reverse direction until the detent roller 53 is brought into contact with the first wall 65 (refer to FIG. 4).

Figure 9:
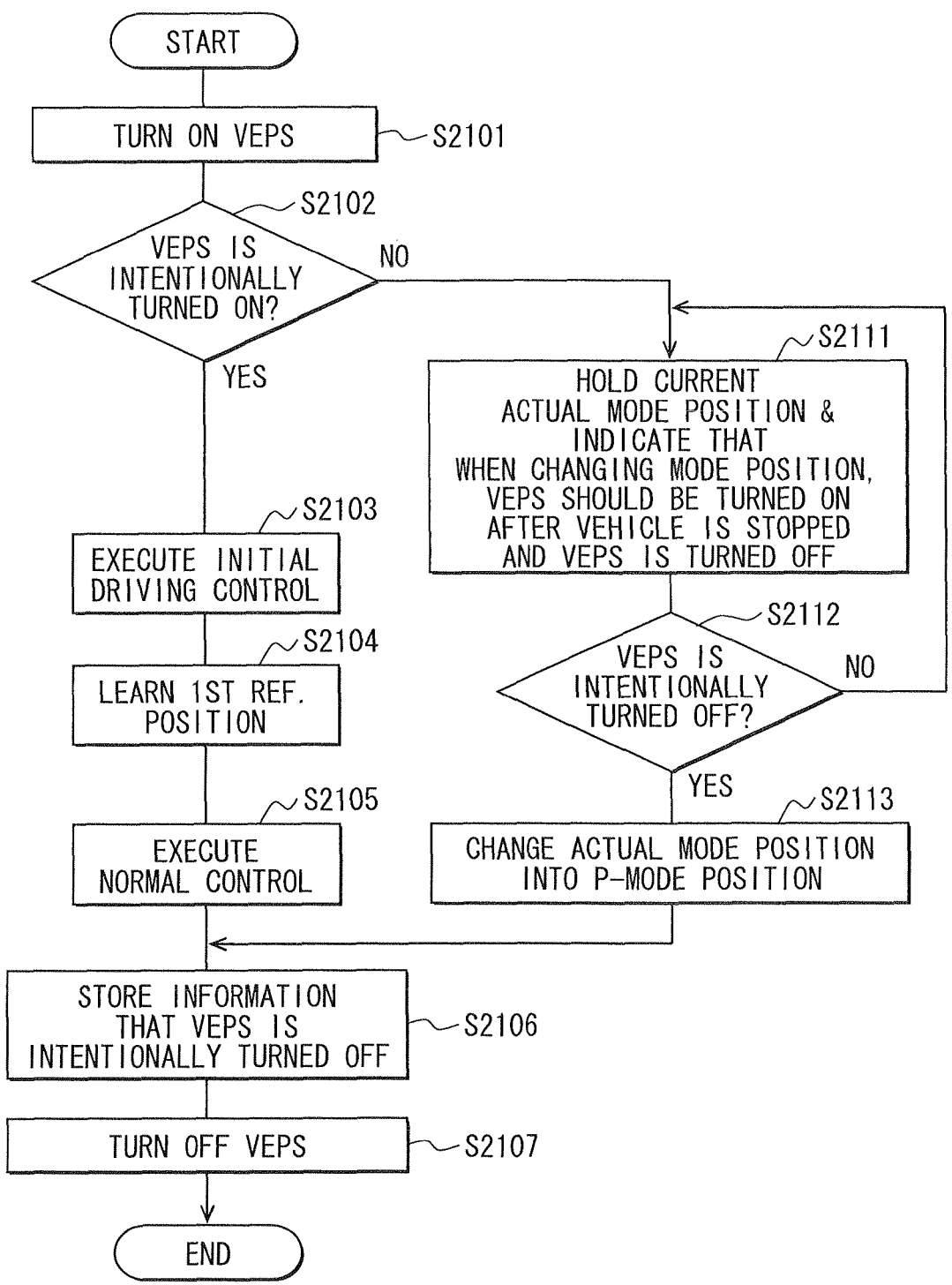
FIG. 9 is a flowchart showing a processing for learning a rotational position of an actuator according to a fourth embodiment.

Referring to FIG. 9, a learning processing of the reference position of the actuator 30 by the SBW-ECU 13 will be described hereinafter.

In step S2101, the vehicle control system 1 is energized when the vehicle electric power source (VEPS) is turned on. The case in which the vehicle electric power source (VEPS) is turned on includes: a first case in which a driver stops a vehicle and intentionally turns off an ignition switch and then turns on the ignition switch; and a second case in which the vehicle electric power is momentarily turned off without respect to the driver's intension and then automatically turned on.

In step S2102, the SBW-ECU 13 determines whether it is the first case or the second case. The SBW-ECU 13 conducts this determination based on "information about vehicle electric power source (VEPS) condition" which was stored in the memory portion 15 when the vehicle electric power source (VEPS) was previously turned off. The SBW-ECU 13 and the memory portion 15 function as a power source determining portion. The processing for storing the information about vehicle electric power source (VEPS) condition will be described later in step S2107.

When the answer is YES in step S2102, the procedure proceeds to step S2103. When the answer is NO in step S2101, the procedure proceeds to step S2111. Before the procedure proceeds to step S2103 or S2111, the information about vehicle electric power source (VEPS) is erased.

In step S2103, the SBW-ECU 13 executes an initial driving control of the actuator 30, whereby the rotation of the actuator 30 is appropriately controlled. Then, the procedure proceeds to step S2104 in which the SBW-ECU 13 functions as a first position learning portion which learns a first reference position of the actuator 30. Then, the procedure proceeds to step S2105.

In step S2105, the SBW-ECU 13 executes a normal control of the shift-by-wire system 3 (actuator 30). That is, the SBW-ECU 13 computes the position of the actuator 30 with respect to each mode position based on the first specified value stored in the memory portion 15 and the first reference position learned in step S2104. Then, the SBW-ECU 13 drives the actuator 30 so that the position of the actuator 30 is brought into the computed position. In the above normal control, the SBW-ECU 13 functions as the target mode position determining portion which determines the target mode position based on the signal from the selector sensor 46, a brake signal and a signal from the vehicle speed sensor 24, and controls the actuator 30 so that the mode position of the automatic transmission 20 agrees with the determined target mode position.

In step S2111, the SBW-ECU 13 and the integrated ECU 10 indicate to the driver through the display 47 that when the mode position is changed, the vehicle electric power source (VEPS) should be turned on after a vehicle is stopped and the vehicle electric power source (VEPS) is turned off once. Alternatively, the SBW-ECU 13 and the integrated ECU 10 may indicate the above matter to the driver through the speaker 48. At this moment, the SBW-ECU 13 does not drive the actuator 30 to hold the current actual mode position.

In step S2111, if the SBW-ECU 13 determines, based on the signal from the selector sensor 46, that the driver requires to change the mode position, the driver is notified that it is unacceptable to change the mode position by means of the speaker 48 or the display 47. It should be noted that the SBW-ECU 13, the integrated ECU 10, the speaker 48 and the display 47 function as a warning portion of the present invention.

In S2112, the SBW-ECU 13 determines whether a driver intentionally turns off the vehicle electric power source. Specifically, it is determined whether the driver stops a vehicle and turns off an ignition switch. When the answer is YES in step S2112, the procedure proceeds to step S2113. When the answer is NO in step S2112, the procedure goes back to step S2111.

In step S2113, the SBW-ECU 13 rotates the actuator 30 in a reverse direction until the count value of the pulse signals from the encoder 34 does no vary for a specified time period, whereby the actual mode position is changed into the P-mode position.

In S2106, the memory portion 15 stores information that the vehicle electric power source (VEPS) is intentionally turned off by a driver if so. This information about the vehicle electric power source (VEPS) is stored in the nonvolatile memories, such as EEPROM of the memory portion 15. It should be noted that the last-stored information about vehicle electric power source (VEPS) is referred in step S2102 as the information for determining whether it is the first case or the second case.

When the vehicle electric power source (VEPS) is turned off in step S2107, the processing shown in FIG. 9 is terminated. The case in which the vehicle electric power source (VEPS) is turned off includes: a first case in which a driver intentionally turns off an ignition switch; and a second case in which the vehicle electric power source (VEPS) is momentarily turned off without respect to the driver's intension.

Even though the vehicle electric power source (VEPS) is turned off in step S2107, the information about vehicle electric power source (VEPS) stored in the memory portion 15 in step S2106 is not erased.

As explained above, according to the present embodiment, the SBW-ECU 13 learns the first reference position of the actuator 30, whereby the rotational position of the actuator 30 with respect to each mode position (P-mode, R-mode, N-mode, and D-mode) is computed based on the stored first specified value and the stored first reference position. The actuator 30 is driven to the computed rotational position, whereby the actual mode position is changed to the desired mode position.

Also, the SBW-ECU 13 functions as a power source determining portion which determines whether a driver intentionally turns off an ignition switch and then turns on the ignition switch again or the vehicle electric power is momentarily turned off without respect to the driver's intension and then automatically turned on.

When it is determined that the vehicle electric power source (VEPS) is intentionally turned on by a driver, the first position learning portion learns the first reference position. Usually, in this case, it is assumed that the actual mode position is the P-mode position and the vehicle is stopped. Therefore, even though the learning of the first reference position is started at this moment, the actual mode position is kept at the P-mode position, whereby the first reference position can be learned safely and the normal control condition can be executed. Further, in a case that the vehicle electric power source (VEPS) is unintentionally turned off while the actual mode position is other than the P-mode range and then the vehicle electric power source (VEPS) is intentionally turned on by a driver, even if the learning of the first reference position is started and the wheels are locked, there is no problem because the vehicle is stopped.

Meanwhile, when it is determined that the vehicle electric power source (VEPS) is turned on after momentarily turned off, the SBW-ECU 13 indicates to the driver that the vehicle should be stopped and the vehicle electric power source (VEPS) is turned off when the mode position is changed. The actuator 30 is not driven so that the actual mode position is maintained.

After the vehicle is stopped and the vehicle electric power source (VEPS) is turned off, the vehicle electric power source (VEPS) is turned on again. It is determined that the vehicle electric power source (VEPS) is intentionally turned on by the driver, the first position learning portion learns the first reference position while the vehicle is stopped. Thereby, the shift-by-wire system 3 is returned to a normal control condition. It should be noted that since the vehicle electric power source (VEPS) is turned off after the actual mode position is changed into the P-mode position, the vehicle power source is turned on next time while the actual mod position is the P-mode position.

As described above, according to the shift-by-wire system 3 of the present embodiment, even if the vehicle electric power source (VEPS) is momentarily turned off, the normal control condition can be safely recovered.

Other Embodiment

As long as the first end concave portion corresponds to the P-mode position, the second end concave portion corresponds to the D-mode position or the Low-D-mode position, and the middle concave portions correspond to the R-mode position and the N-mode position, any number of the middle concave portion can be formed. That is, the number of mode position of the automatic transmission is not limited to four or six.

In the above embodiments, the system is provided with the notification portion and the warning portion. Meanwhile, only one of the notification portion and the warning portion can be provided to the system. Alternatively, the system may not be provided with both the notification portion and the warning portion.

The shift-by-wire system of the present invention can be applied to a continuously variable transmission (CVT) and an automatic transmission having four mode positions (P, R, N, and D) for a hybrid vehicle (HV).

The present invention is not limited to the embodiment mentioned above, and can be applied to various embodiments.

What is claimed is:

1. A shift-by-wire system for changing a mode position of the automatic transmission of a vehicle according to a signal of a shift selector manipulated by a driver of the vehicle, the shift-by-wire system comprising:

an actuator including an electric motor, an incremental type encoder outputting a pulse signal according to a rotation of the motor, and a reduction gear reducing the rotation of the motor and outputting the reduced rotation;

a detent plate connected to the reduction gear to be rotated by the actuator, the detent plate having a first end concave portion formed at one end in a rotational direction thereof, a second end concave portion formed at the other end in a rotational direction, and a plurality of middle concave portions formed between the first end concave portion and the second end concave portion;

a detent spring having a regulating portion which can be engaged with one of the first end concave portion, the middle concave portions, and the second end concave portion to regulate a rotation of the detent plate so that the mode position of the automatic transmission is fixed; and a control portion defining a target mode position based on the signal of the shift selector and driving the actuator so that the mode position of the automatic transmission is brought into the target mode position, wherein the first end concave portion corresponds to a parking-mode position and defines a first wall, the second end concave portion corresponds to a position for driving a vehicle forward and defines a second wall, the middle concave portions correspond to at least a reverse-mode position and a neutral-mode position, the control portion includes:

a first position learning portion which drives the motor in a direction in which the regulating portion is brought into contact with the first wall, and learns a first reference position of the actuator corresponding to the parking-mode position when it is detected that a maximum value or a minimum value of a count number of the pulse signal outputted from the encoder does not change for a specified time period; and a second position learning portion which drives the motor in a direction in which the regulating portion is brought into contact with the second wall, and learns a second reference position of the actuator corresponding to the drive-mode position when it is detected that the maximum value or the minimum value of the count number of the pulse signal outputted from the encoder does not change for a specified time period, wherein when a vehicle electric power source is turned on, the first position learning portion learns the first reference position in a case that the target mode position is the parking-mode position, the second position learning portion learns the second reference position in a case that the target mode position is a mode position corresponding to the second end concave portion, the control portion does not drive the actuator to maintain a current mode position in a case that the target mode position is other than the parking-mode position and a mode position corresponding to the second end concave portion, the control portion accepts only a requirement for changing the mode position to the parking-mode position or the mode position corresponding to the second end concave portion, the first position learning portion learns the first reference position when it is required to change the mode position to the parking-mode position, and the second position learning portion learns the second reference position when it is required to change the mode position to the mode position corresponding to the second end concave portion.

2. A shift-by-wire system according to claim 1, further comprising a notification portion which notifies a driver of a situation where the mode position can be changed into only the parking-mode position or the mode position corresponding to the second end concave portion.

3. A shift-by-wire system according to claim 1, further comprising a warning portion which notifies the driver of the situation where the mode position can not be changed into other than the parking-mode position and the mode position corresponding to the second end concave portion when it is required to change the mode position into other than the parking-mode position and the mode position corresponding to the second end concave portion.

4. A shift-by-wire system according to claim 1, the control portion further includes a memory portion which stores a condition of the actuator and the actual mode position of when the vehicle electric power source is turned off, and a target mode position establishing portion which sets a target mode position, wherein when the vehicle electric power source is turned on, the target mode position establishing portion sets the actual mode position stored in the memory portion as the target mode position in a case that the actuator is at a stop condition, and the target mode position is unfixed in a case that the actuator is at the operated condition.

5. A shift-by-wire system for changing a mode position of the automatic transmission of a vehicle according to a signal of a shift selector manipulated by a driver of the vehicle, the shift-by-wire system comprising:

an actuator including an electric motor, an incremental type encoder outputting a pulse signal according to a rotation of the motor, and a reduction gear reducing the rotation of the motor and outputting the reduced rotation;

a detent plate connected to the reduction gear to be rotated by the actuator, the detent plate having a first end concave portion formed at one end in a rotational direction thereof, a second end concave portion formed at the other end in a rotational direction, and a plurality of middle concave portions formed between the first end concave portion and the second end concave portion;

a detent spring having a regulating portion which can be engaged with one of the first end concave portion, the middle concave portions, and the second end concave portion to regulate a rotation of the detent plate so that the mode position of the automatic transmission is fixed;

a control portion defining a target mode position based on the signal of the shift selector and driving the actuator so that the mode position of the automatic transmission is brought into the target mode position; and a torque control portion intercepting or reducing a transmission of a driving torque from the engine to the wheels, wherein the first end concave portion corresponds to a parking-mode position and defines a first wall, the second end concave portion corresponds to a drive-mode position and defines a second wall, the middle concave portions correspond to at least a reverse-mode position and a neutral-mode position, the control portion includes:

a first position learning portion which drives the motor in a direction in which the regulating portion is brought into contact with the first wall, and learns a first reference position of the actuator corresponding to the parking-mode position when it is detected that a maximum value or a minimum value of a count number of the pulse signal outputted from the encoder does not change for a specified time period;

a second position learning portion which drives the motor in a direction in which the regulating portion is brought into contact with the second, and learns a second reference position of the actuator corresponding to the driving-mode position when it is detected that a maximum value or a minimum value of a count number of the pulse signal outputted from the encoder does not change for a specified time period; and a power source determining portion which determines whether the vehicle electric power source is intentionally turned on by a driver or the vehicle electric power source is turned on after momentarily turned off, wherein when it is determined that the vehicle electric power source is intentionally turned on by the driver, the first position learning portion learns the first reference position, when it is determined that the vehicle electric power source is turned on after momentarily turned off, the torque control portion intercepts or reduces the transmission of the driving torque and makes impossible to receive a requirement for changing the mode position, at least one of the first reference position and the second reference position is learned, subsequently the mode position is changed to the specified mode position and it is made possible to receive a requirement for changing the mode position.

6. A shift-by-wire system according to claim 5, further comprising:

a first notification portion which notifies a driver of a situation in which it is impossible to accept a requirement for changing a mode position.

7. A shift-by-wire system according to claim 5, further comprising:

a warning portion which notifies the driver of the situation where the mode position can not be changed.

8. A shift-by-wire system according to claim 5, further comprising:

a second notification portion which notifies a driver of a situation in which it is possible to accept a requirement for changing a mode position.

9. A shift-by-wire system according to claim 5, wherein the torque control portion includes:

a portion which can shift a transmission gear to a neutral mode position;

a switching portion which switches a condition of a driving motor between a condition where the driving motor is energized and a condition where the driving motor is deenergized in a case that the driving torque is generated by the driving motor; and a throttle valve control portion which adjusts an intake air flow rate in a case that the driving torque is generated by an internal combustion engine.

10. A shift-by-wire system according to claim 5, wherein the control portion further includes:

a memory portion which stores the condition of the actuator and the actual mode position of when the vehicle electric power source is turned off; and a target mode position establishing portion which establishes the actual mode position stored in the memory portion as the target mode position in a case that the stored condition of the actuator is a stop condition when the vehicle electric power source is turned on, and which establishes that the target mode position is an unfixed condition in a case that the stored condition of the actuator is at an operated condition when the vehicle electric power source is turned on, in a case that the target mode position established by target mode position establishing portion is other than an unfixed condition, the control portion establishes the target mode position as a specified mode position, in a case that the target mode position is unfixed, the control portion establishes the target mode position as the specified mode position and does not drive the actuator until the target mode position is fixed so that the current actual mode position is maintained.

11. A shift-by-wire system according to claim 5, wherein in a case that the only one of the first reference position and the second reference position is learned, the control portion determines whether the first reference position is learned or the second reference position is learned based on the target mode position of when the vehicle electric power source is turned on.

12. A shift-by-wire system according to claim 11, wherein the first position learning portion learns the first reference position in a case that the target mode position is the parking-mode position when the vehicle electric power source is turned on, and the second position learning portion learns the second reference position in a case that the target mode position is other than the parking-mode position when the electric power source is turned off.

13. A shift-by-wire system according to claim 5, wherein when the power source determining portion determines that the vehicle electric power source is turned on after unintentionally turned off and the target mode position is a mode position corresponding to the second end concave portion, the control portion continues to transmit the driving force to the wheels without intercepting or reducing the transmission of the driving force by the torque control portion.

14. A shift-by-wire system for changing a mode position of the automatic transmission of a vehicle according to a signal of a shift selector manipulated by a driver of the vehicle, the shift-by-wire system comprising:

an actuator including an electric motor, an incremental type encoder outputting a pulse signal according to a rotation of the motor, and a reduction gear reducing the rotation of the motor and outputting the reduced rotation;

a detent plate connected to the reduction gear to be rotated by the actuator, the detent plate having a first end concave portion formed at one end in a rotational direction thereof, a second end concave portion formed at the other end in a rotational direction, and a plurality of middle concave portions formed between the first end concave portion and the second end concave portion;

a detent spring having a regulating portion which can be engaged with one of the first end concave portion, the middle concave portions, and the second end concave portion to regulate a rotation of the detent plate so that the mode position of the automatic transmission is fixed; and a control portion defining a target mode position based on the signal of the shift selector and driving the actuator so that the mode position of the automatic transmission is brought into the target mode position, wherein the first end concave portion corresponds to a parking-mode position and defines a first wall, the second end concave portion corresponds to a position for driving a vehicle forward and defines a second wall, the middle concave portions correspond to at least a reverse-mode position and a neutral-mode position, the control portion includes:

a first position learning portion which drives the motor in a direction in which the regulating portion is brought into contact with the first wall and learns a first reference position of the actuator corresponding to the parking-mode position when it is detected that a maximum value or a minimum value of a count number of the pulse signal outputted from the encoder does not change for a specified time period; and a power source determining portion which determines whether the vehicle electric power source is intentionally turned on by a driver or the vehicle electric power source is turned on after momentarily turned off, wherein when it is determined that the vehicle electric power source is intentionally turned on by the driver, the first position learning portion learns the first reference position, when it is determined that the vehicle electric power source is turned on after momentarily turned off, a driver of the vehicle is notified that after the vehicle is stopped and the vehicle electric power source is turned off, the vehicle electric power source should be turned on, and further the actuator is not driven to maintain the current actual mode position.

15. A shift-by-wire system according to claim 14, further comprising a warning portion which notifies the driver of the situation where the mode position can not be changed.

* * * * *